United States Patent
Akash et al.

(10) Patent No.: US 11,332,165 B2
(45) Date of Patent: May 17, 2022

(54) HUMAN TRUST CALIBRATION FOR AUTONOMOUS DRIVING AGENT OF VEHICLE

(71) Applicant: Honda Motor Co., Ltd., Tokyo (JP)

(72) Inventors: Kumar Akash, West Lafayette, IN (US); Teruhisa Misu, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 216 days.

(21) Appl. No.: 16/773,673

(22) Filed: Jan. 27, 2020

(65) Prior Publication Data

US 2021/0229707 A1 Jul. 29, 2021

(51) Int. Cl.
*B60W 60/00* (2020.01)
*B60W 50/14* (2020.01)
*B60W 40/09* (2012.01)
*G06F 3/01* (2006.01)
*G06V 20/20* (2022.01)
(Continued)

(52) U.S. Cl.
CPC ........ *B60W 60/0059* (2020.02); *B60W 40/09* (2013.01); *B60W 50/14* (2013.01); *G06F 3/013* (2013.01); *G06V 20/20* (2022.01); *G06V 20/56* (2022.01); *G06V 20/597* (2022.01); *B60W 2050/146* (2013.01)

(58) Field of Classification Search
None
See application file for complete search history.

(56) References Cited

U.S. PATENT DOCUMENTS

2019/0250408 A1* 8/2019 Lafon ................ B64D 43/00
2019/0283762 A1* 9/2019 el Kaliouby ............ G06N 3/08
(Continued)

OTHER PUBLICATIONS

L. Morra, F. Lamberti, F. G. Prattico, S. L. Rosa and p. Montuschi, "Building Trust in Autonomous Vehicles: Role of Virtual Reality Driving Simulators in HMI Design," in IEEE Transactions on Vehicular Technology, vol. 68, No. 10, pp. 9438-9450, Oct. 2019, doi: 10.1109/TVT.2019.2933601. (Year: 2019).*
(Continued)

*Primary Examiner* — Genna M Mott
(74) *Attorney, Agent, or Firm* — Aaron Fong; American Honda Motor Co., Inc.

(57) ABSTRACT

An autonomous driving agent is provided. The autonomous driving agent determines a set of observations from sensor information of a sensor system of a vehicle. The set of observations includes human attention information for a scene of surrounding environment and a level of human reliance as indicated by human inputs to the autonomous driving agent. The autonomous driving agent estimates, based on the set of observations, belief states for a first state of human trust on the autonomous driving agent and a second state of human's cognitive workload during journey. The autonomous driving agent selects, based on the estimated belief states, a first value for a first action associated with a level of automation transparency between a human user and the autonomous driving agent and controls a display system based on the selected first value to display a cue for calibration of the human trust on the autonomous driving agent.

17 Claims, 9 Drawing Sheets

(51) Int. Cl.
  *G06V 20/56*  (2022.01)
  *G06V 20/59*  (2022.01)

(56) References Cited

U.S. PATENT DOCUMENTS

| | | | |
|---|---|---|---|
| 2019/0310650 A1* | 10/2019 | Halder | G06N 3/006 |
| 2019/0310654 A1* | 10/2019 | Halder | G05D 1/0088 |
| 2020/0180647 A1* | 6/2020 | Anthony | G08G 1/0145 |
| 2020/0213560 A1* | 7/2020 | Zhang | B60K 37/06 |
| 2020/0331491 A1* | 10/2020 | Wray | B60W 60/0011 |
| 2020/0334479 A1* | 10/2020 | Szczerba | G06K 9/00845 |
| 2021/0009154 A1* | 1/2021 | Wray | B60W 60/001 |
| 2021/0011607 A1* | 1/2021 | Ziman | G06F 3/011 |
| 2021/0035447 A1* | 2/2021 | Urano | B60W 30/0956 |
| 2021/0078602 A1* | 3/2021 | Wray | B60W 60/0025 |
| 2021/0157314 A1* | 5/2021 | Wray | B60W 30/17 |
| 2021/0200208 A1* | 7/2021 | Wray | G05D 1/0088 |
| 2021/0221404 A1* | 7/2021 | Reiner | B60W 40/08 |

OTHER PUBLICATIONS

K. Okamura and S. Yamada, "Empirical Evaluations of Framework for Adaptive Trust Calibration in Human-AI Cooperation," in IEEE Access, vol. 8, pp. 220335-220351, Dec. 4, 2020, doi: 10.1109/ACCESS.2020.3042556. (Year: 2020).*

A. Xu and G. Dudek, "Maintaining efficient collaboration with trust-seeking robots," 2016 IEEE/RSJ International Conference on Intelligent Robots and Systems (IROS), 2016, pp. 3312-3319, doi: 10.1109/IROS.2016.7759510. (Year: 2016).*

A. Rotsidis, A. Theodorou, J. J. Bryson and R. H. Wortham, "Improving Robot Transparency: An Investigation With Mobile Augmented Reality," 2019 28th IEEE International Conference on Robot and Human Interactive Communication (RO-MAN), 2019, pp. 1-8, doi: 10.1109/RO-MAN46459.2019.8956390. (Year: 2019).*

P. Lindemann, T. Lee and G. Rigoll, "An Explanatory Windshield Display Interface with Augmented Reality Elements for Urban Autonomous Driving," 2018 IEEE International Symposium on Mixed and Augmented Reality Adjunct (ISMAR-Adjunct), 2018, pp. 36-37, doi: 10.1109/ISMAR-Adjunct.2018.00027. (Year: 2018).*

Chen, et al., "Situation Awareness-Based Agent Transparency", ARL-TR-6905, Affiliation: US Army Research Laboratory, Jan. 2014, 37 pages.

Mercado, et al., "Intelligent Agent Transparency in Human-Agent Teaming for Multi-UxV Management", Human Factors: The Journal of the Human Factors and Ergonomics Society, vol. 58, Issue 3, 2016, 15 pages.

Bohua, et al., "Driver's Visual Cognition Behaviors of Traffic Signs Based on Eye Movement Parameters", Journal of Transportation Systems Engineering and Information Technology, vol. 11, Issue 4, Aug. 2011, pp. 22-27.

Cassandra, et al., "Acting optimally in partially observable stochastic domains", Association for the Advancement of Artificial Intelligence, 1994, 8 pages.

* cited by examiner

HUMAN TRUST CALIBRATION FOR AUTONOMOUS DRIVING AGENT OF VEHICLE

BACKGROUND

With advancements in self-driving technology, there has been a rise in adoption of sensor-based driving automation systems in vehicles. The self-driving technology may be implemented through driving automation systems, such as Advanced Driver-Assistance Systems (ADAS). Human users are increasingly becoming dependent on ADAS features, such as adaptive cruise control, lane assist, or collision avoidance. Despite significant advancements, human supervision and intervention may still be required. It has also been found that human trust may play a critical role in interactions between a human user of the vehicle and a driving automation system of the vehicle. For example, low levels of human trust may lead to disuse of the driving automation system. Whereas, an excessively reliance on the capabilities of the driving automation system under unsafe conditions or situations outside of the scope of automation design, may lead to over trust which may result in unintended consequences for the human user.

Limitations and disadvantages of conventional and traditional approaches will become apparent to one of skill in the art, through comparison of described systems with some aspects of the present disclosure, as set forth in the remainder of the present disclosure and with reference to the drawings.

SUMMARY

An exemplary aspect of the disclosure provides an autonomous driving agent of a vehicle. The autonomous driving agent includes circuitry coupled to a display system of the vehicle. The circuitry may determine a set of observations from sensor information acquired via at least one sensor of the vehicle. The set of observations may include human attention information associated with a scene of a surrounding environment of the vehicle and a level of human reliance as indicated by human inputs to the autonomous driving agent. The circuitry may estimate, based on the determined set of observations, a set of belief states for a first state of human trust on the autonomous driving agent and a second state of a human's cognitive workload in course of a journey. Further, the circuitry may select, based on the estimated set of belief states, a first value of a set of values for a first action associated with a level of automation transparency between a human user of the vehicle and the autonomous driving agent. Based on the selected first value, the circuitry may control the display system to display a cue for calibration of human trust on the autonomous driving agent.

Another exemplary aspect of the disclosure provides a method for human trust calibration for an autonomous driving agent of a vehicle. The method may be implemented by any computing system, such as by an autonomous driving agent for a vehicle. The method may include determining a set of observations from sensor information acquired via at least one sensor of the vehicle. The set of observations may include human attention information associated with a scene of a surrounding environment of the vehicle and a level of human reliance as indicated by human inputs to the autonomous driving agent. The method may further include estimating, based on the determined set of observations, a set of belief states for a first state of human trust on the autonomous driving agent and a second state of a human's cognitive workload in course of a journey. The method may further include selecting, based on the estimated set of belief states, a first value of a set of values for a first action associated with a level of automation transparency between a human user of the vehicle and the autonomous driving agent. The method may further include controlling, based on the selected first value, a display system to display a cue for a calibration of the human trust on the autonomous driving agent.

Another exemplary aspect of the disclosure provides a non-transitory computer-readable medium having stored thereon computer implemented instructions that, when executed by an autonomous driving agent of a vehicle, causes the autonomous driving agent to execute operations. Such operations may include determining a set of observations from sensor information acquired via at least one sensor of the vehicle. The set of observations may include human attention information associated with a scene of a surrounding environment of the vehicle and a level of human reliance as indicated by human inputs to the autonomous driving agent. The operations may further include estimating, based on the determined set of observations, a set of belief states for a first state of human trust on the autonomous driving agent and a second state of a human's cognitive workload in course of a journey. Further, the operations may include selecting, based on the estimated set of belief states, a first value of a set of values for a first action associated with a level of automation transparency between a human user of the vehicle and the autonomous driving agent. Thereafter, based on the selected first value, the operations may include controlling a display system to display a cue for a calibration of the human trust on the autonomous driving agent.

Figure 1:
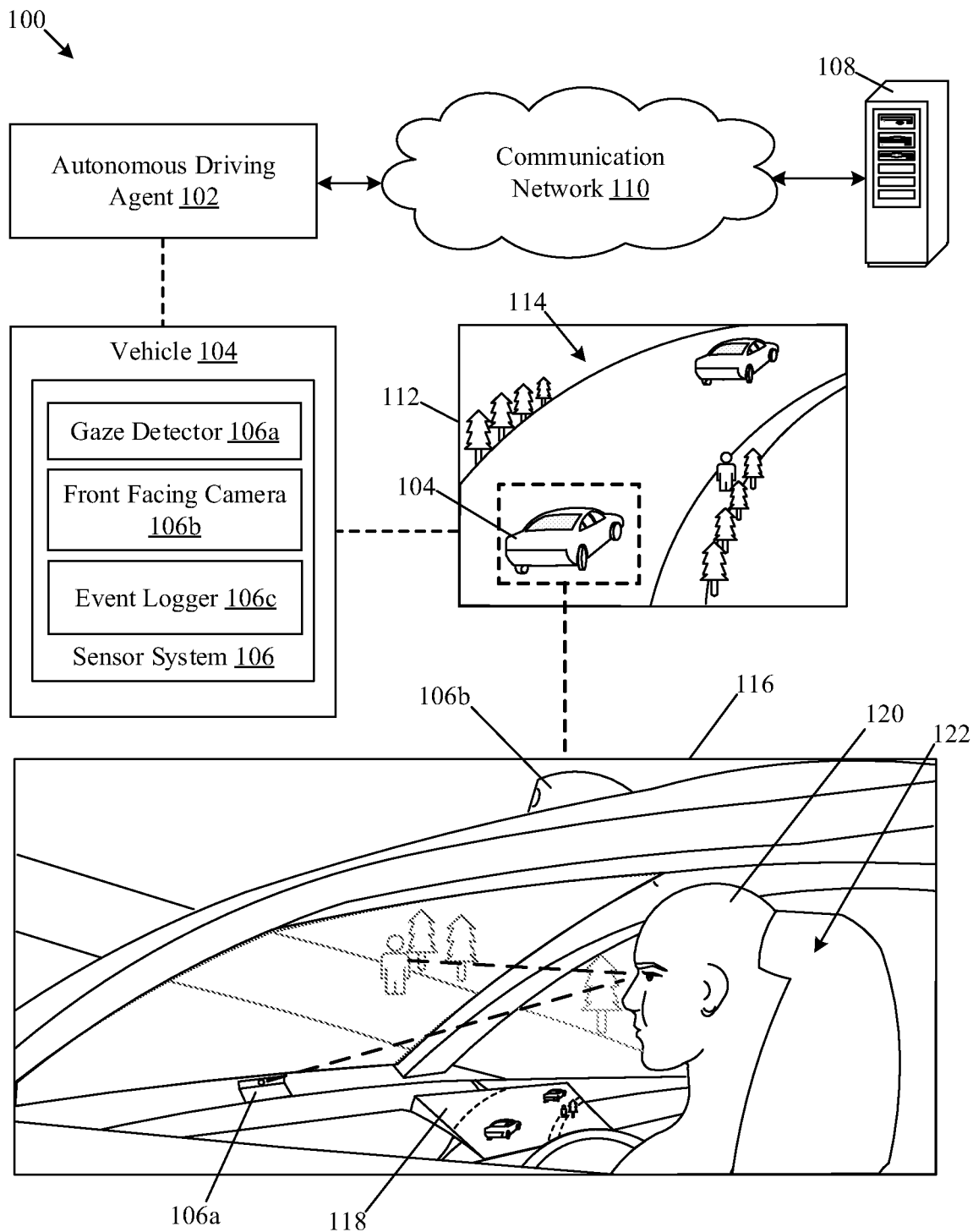
FIG. 1 illustrates an exemplary environment for calibration of human trust on an autonomous driving agent of a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed autonomous driving agent for a vehicle. The disclosed autonomous driving agent may operate on a paradigm that may anticipate human interaction or human behavior and may influence a human user to make optimal choices about use of the autonomous driving agent when the vehicle is in course of a journey and is controlled by the autonomous driving agent. The human interaction or the human behavior may be associated with human trust in automation (i.e. autonomous driving agent) in real time or near real time. For such an approach, the present disclosure provides a quantitative method to predict the human behavior and to determine optimal interventions to influence the human behavior. As the human trust and human's cognitive workload may be coupled to each other and may influence the use of the autonomous driving agent 102, the autonomous driving agent implements a trust-workload model as per a Partially Observable Markov Decision Process (POMDP) framework to model a trust-workload relationship of the human behavior in an autonomous driving context (such as a hands-off SAE (Society of Automotive Engineers) level 2 driving context). In such a context, the trust-workload model may provide the ability to measure states of the human trust and the human's cognitive workload, continuously, and in real time or near real time in course of a journey, using belief state estimates.

In order to calibrate the human trust, the autonomous driving agent may define a reward function as a function of the state of the human trust and the automation reliability. The trust-workload model may consider the automation reliability, the automation transparency, and the scene complexity, together with human reliance on the autonomous driving agent and human attention (e.g., in terms of eye gaze behavior in course of a journey), to model human trust-workload relationship. The autonomous driving agent may implement an optimal control policy that may be used to dynamically vary the automation transparency based on the belief state estimates of the trust-workload model for the states of the human trust and the human's cognitive workload. Specifically, the autonomous driving agent may display cue(s) on a display system of the vehicle to setup a particular level of the automation transparency between the human user of the vehicle and the autonomous driving agent. For example, such cue(s) may include visual indicators for objects (e.g., pedestrian, vehicles, road, etc.) detected in a driving scene of a surrounding environment of the vehicle or decisions (e.g., left turn, right turn, etc.) made by the autonomous driving agent. By displaying such cue(s), the autonomous driving agent may be able to showcase one or more of: intended actions, actions that it performs, plans, reasons, or its understanding of the scene complexity of the surrounding environment. By doing so, the autonomous driving agent may be able to provide a feedback to the human user to calibrate the human trust on the autonomous driving agent. This may be needed especially if the human user is determined to be in a state of over trust or a state of under trust for the autonomous driving agent in relation to various factors, such as the automation reliability.

While representation of cues may increase the human trust on the autonomous driving agent, however, too many cues may distract the human user and may lead to an increase in the human's cognitive workload, especially if the human's cognitive workload is already high. Thus, the autonomous driving agent may display an appropriate number and types of cues according to the optimal control policy for the automation transparency and the belief state estimates for the states of the human trust and the human's cognitive workload.

FIG. 1 illustrates an exemplary environment for calibration of human trust on an autonomous driving agent of a vehicle, in accordance with an embodiment of the disclosure. With reference to FIG. 1, there is shown an exemplary network environment 100. In the exemplary network environment 100, there is shown an autonomous driving agent 102 and a vehicle 104 that may include the autonomous driving agent 102. There is further shown a sensor system 106, a server 108, and a communication network 110 which may be established among one or more of: the autonomous driving agent 102, the vehicle 104, the sensor system 106, and the server 108. There is further shown a view 112 of a surrounding environment 114 and a side view 116 of the vehicle 104 in the surrounding environment 114. The surrounding environment 114 may include the vehicle 104 and other objects, such as pedestrians, trees, roads, street signs, other vehicles, or traffic lights. In the side view 116, there is shown a display system 118 and a human user 120 who is shown to be seated on a driver's seating position 122 in the vehicle 104. In the side view 116, there is further shown an exemplary implementation of the sensor system 106 through a gaze detector 106a and a front facing camera 106b.

The autonomous driving agent 102 may include suitable logic, circuitry, interfaces, and/or code that may be configured to operate the vehicle 104 based on a level of automation, as defined by Society of Automotive Engineers (SAE). The autonomous driving agent 102 may be an exemplary implementation of an action automation, where the autonomous driving agent 102 may take an action, unless intervened upon by the human user 120. Unlike a decision automation, where the interaction of the human user 120 with an autonomous agent may be characterized by a compliance whenever the autonomous agent presents a recommendation, the action automation may be characterized by the human user 120 continuously either relying on the autonomous driving agent 102 or intervening to take over control of the autonomous driving agent 102.

The autonomous driving agent 102 may be responsible for human trust calibration when the vehicle 104 is in course of a journey. For example, the autonomous driving agent 102 may determine whether to display a cue (for example, a bounding box or another visual identifier) over a visual representation of a scene of the surrounding environment 114 displayed on the display system 118. By displaying the cue, the autonomous driving agent 102 may be able to showcase its understanding of scene complexity (including objects) of the surrounding environment 114. By doing so, the autonomous driving agent 102 may be able to provide a feedback to the human user 120 to calibrate the human trust on the autonomous driving agent 102. This may be needed especially if the human user 120 is determined to be in a state of over trust or a state of under trust for the autonomous driving agent 102 in relation to various factors, such as a level of automation reliability.

In an exemplary implementation, the autonomous driving agent 102 may be implemented as a computer, such as an in-vehicle Electronic Control Unit (ECU), onboard the vehicle 104. In such a case, the autonomous driving agent 102 may be implemented as a specialized electronic circuitry that may include one or more processors to control different functions, such as, but not limited to, engine operations, steering controls, transmission controls, braking controls, communication operations, or data acquisition from the sensor system 106.

The autonomous driving agent 102 may be configured to communicate with different in-vehicle components, such as a vehicle control system, an in-vehicle infotainment (IVI) system, an in-car entertainment (ICE) system, an automotive Head-up Display (HUD), an automotive dashboard, a smartphone, a human-machine interface (HMI), a computer workstation, a handheld computer, a portable consumer electronic (CE) device, a server, or other computing devices.

Although, in FIG. 1, the autonomous driving agent 102 is shown as a part of the vehicle 104; however, the disclosure may not be so limiting and in some embodiments, the autonomous driving agent 102 may be a separate entity, which may control the vehicle 104 remotely via the communication network 110, without a deviation from the scope of the disclosure. In such an implementation of the autonomous driving agent 102, the autonomous driving agent 102 may be implemented on one of: a Vehicle-to-Everything (V2X) network, an application server, a web server, a cloud server (or a cluster of cloud servers), a factory server, a consumer-electronic (CE) device, or a dedicated vehicle control server.

The vehicle 104 may be a self-driving vehicle and the autonomous driving agent 102 may be configured to operate the self-driving vehicle based on a level of automation, as defined by the SAE. For example, the autonomous driving agent 102 may operate the vehicle 104 based on a SAE level-2 vehicle automation, in which the steering and brake/acceleration of the vehicle 104 may be controlled by the autonomous driving agent 102. Examples of the vehicle 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

In at least one embodiment, the vehicle 104 may include a capability to drive itself from a starting point to a destination point based on various vehicle-related technologies and sensors, including adaptive cruise control, active steering, anti-lock braking systems (brake by wire), Global Navigation Satellite System (GNSS) navigation technology, lasers, cameras, RADAR system(s), On-Board Units (OBUs), or Light Detection and Ranging (LIDAR) system(s). Details of such vehicle-related technologies and sensors are omitted from the disclosure for the sake of brevity.

Although, in FIG. 1, the vehicle 104 is illustrated as a four-wheeler car; however, the present disclosure may not be limited to the implementation of the vehicle 104 as a four wheeler vehicle. In at least one embodiment, the vehicle 104 may be one of: an Unmanned Aerial Vehicle (UAV), a manned self-flying vehicle (such as an airplane that has the capability to fly using an autopilot system), a waterborne vehicle (such as a submarine or a ship), an industrial robot (e.g., an articulated robot, a SCARA robot, a delta robot, and a cartesian coordinate robot), an agricultural robot, a mobile robot (e.g., a warehouse robot, an Automated Guided Vehicle (AGV), or an Autonomous Mobile Robots (AMR)), a telerobot, or a service robot. In such implementations of the vehicle 104, the human user 120 may be a human operator or a human supervisor who may monitor operations of the autonomous driving agent 102 for the vehicle 104.

The sensor system 106 may be a heterogeneous sensor system which may include one or more of: the gaze detector 106a, the front facing camera 106b, or an event logger 106c. The gaze detector 106a and the front facing camera 106b may be configured to be mounted on defined locations on the vehicle 104. The sensor system 106 may be configured to acquire sensor information which may include, for example, scene information associated with the surrounding environment 114 and human behavioral data associated with the vehicle 104 and the surrounding environment 114. In at least one embodiment, the acquired sensor information may be multimodal sensor information of the surrounding environment 114. The acquisition of such multimodal information may include, for example, gaze detection results from the gaze detector 106a, a sequence of image frames from the front facing camera 106b, and a log of events associated with human inputs to the autonomous driving agent 102 from the event logger 106c.

The gaze detector 106a may be an in-vehicle sensor with a field-of-view (FOV) which covers at least the passenger compartment of the vehicle 104. As shown, for example, the gaze detector 106a is installed at the center of a bottom portion of a windshield of the vehicle 104. The present disclosure may be also applicable to other positions of the gaze detector 106a, without a deviation from the scope of the disclosure. Examples of the gaze detector 106a may include, but are not limited to, an infrared camera, a color camera, a depth sensor, or an RGB-Depth (D) sensor.

The front facing camera 106b may be configured to capture images from a scene in front of the vehicle 104. As shown, for example, the front facing camera 106b may be installed on a top portion of the body of the vehicle 104. In at least one embodiment, there may be other camera units on the vehicle 104, which may capture a plurality of images frames of the surrounding environment 114 from a plurality of viewpoints.

The front facing camera 106b may include at least one imaging unit, for example, an imaging sensor, a depth sensor, a Red-Green-Blue (RGB) sensor, and/or an infrared (IR) sensor. Examples of the front facing camera 106b may include, but are not limited to, a short-range digital camera, a long-range digital camera, a 360-degree camera, an omnidirectional camera, a panoramic camera, an action camera, a wide-angle camera, a camcorder, a night-vision camera, a camera with a Time-of-flight (ToF) sensor, and/or other devices with image capturing capability.

The event logger 106c may include suitable logic, circuitry, interfaces, and/or code that may be configured to log information associated with the autonomous driving agent

Figure 2:
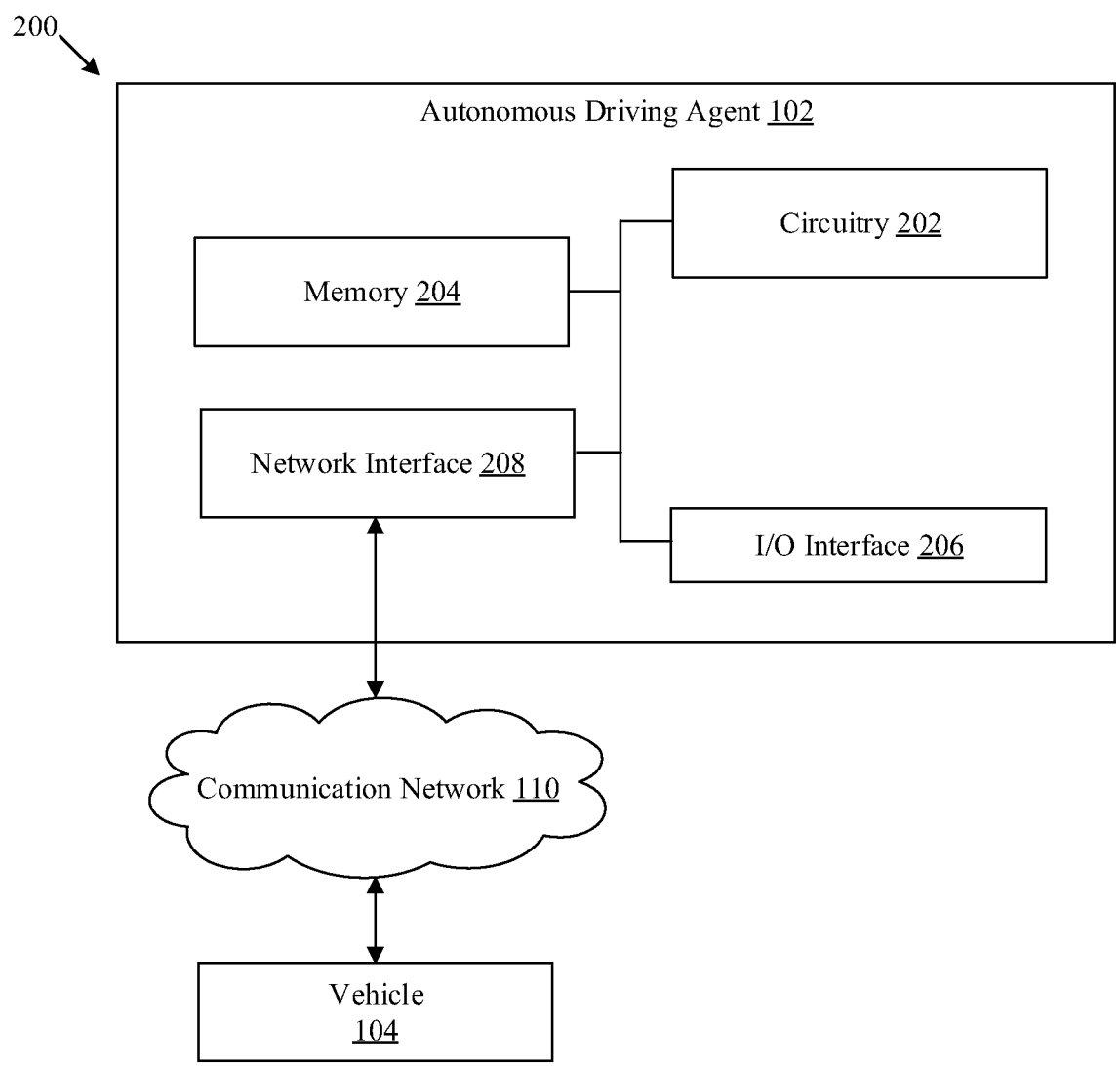
FIG. 2 is a block diagram of the autonomous driving agent of FIG. 1, in accordance with an embodiment of the disclosure.
Figure 3:
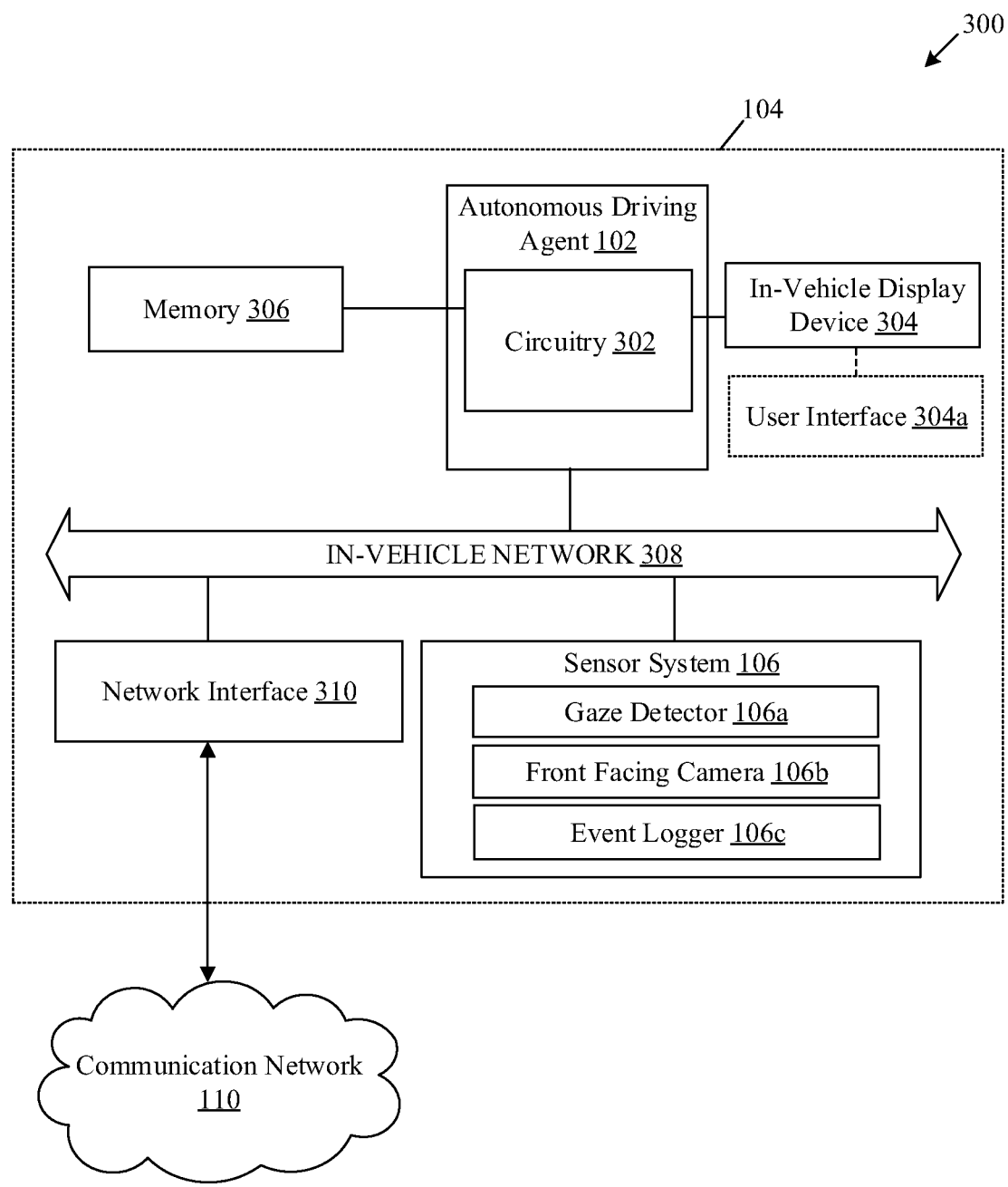
FIG. 3 is a block diagram of an exemplary vehicle that implements the autonomous driving agent of FIG. 1, in accordance with an embodiment of the disclosure.

102. In an embodiment, the event logger 106c may log the human inputs to the autonomous driving agent 102 and may store the logged human inputs and supplementary information (e.g., timestamp) related to the such human inputs in memory (as shown in FIG. 2 or FIG. 3, for example) associated with the autonomous driving agent 102. The human inputs may include a takeover of one or more controls of the vehicle 104, such as, but not limited to, a steering control, a braking action, a control related to manual transmission, or an acceleration control of the vehicle 104 by the human user 120. Additionally, or alternatively, the event logger 106c may also log events associated with a control of the vehicle 104 by the autonomous driving agent 102. Examples of an implementation of the event logger 106c may include, but are not limited to, an automotive event data recorder (EDR) or a computer-executable event monitoring program that may be configured to execute on a computer on-board the vehicle 104.

The server 108 may include suitable logic, circuitry, interfaces, and/or that may be configured to generate and train a stochastic model, which when deployed on the vehicle 104, may be used for calibration of the human trust on the autonomous driving agent 102. The server 108 may share the trained stochastic model with the autonomous driving agent 102 and may be responsible for deployment of the trained stochastic model on the vehicle 104. In some embodiments, the server 108 may be implemented as a cloud server, which may be utilized to execute various operations through web applications, cloud applications, HTTP requests, file transfer, and the like. Examples of the server 108 may include, but are not limited to, an application server, a cloud server, a web server, a database server, a file server, a mainframe server, or a combination thereof.

The communication network 110 may include a communication medium through which the autonomous driving agent 102, the vehicle 104, the sensor system 106, the server 108, and the display system 118 may communicate with each other. The communication network 110 may be one of a wired connection or a wireless connection Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the exemplary network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The display system 118 may include suitable logic, circuitry, and interfaces that may be configured to manage display of information for different operational parameters of the vehicle 104. Such information may include for example, image frames or a video of the scene, annotated with cues to highlight objects, such as nearby vehicles, road-blockages, pedestrians, traffic signs, traffic lights, buildings, or a road portion associated with scene of the surrounding environment 114. Additionally, such information may include mode information related to various driving modes of the vehicle 104, speed-related information, engine speed (i.e. a digital tachometer), Advanced Driver-Assistance System (ADAS) related information, or fuel information. The display system 118 may be also responsible for animation or transition effects with changes in the displayed information over time and based on human inputs. Examples of the display system 118 may include, but are not limited to, a Multi-Information Display (MID), an automotive Head-Up Display (HUD), an instrument cluster, an in-vehicle infotainment system, a navigation system, or an Internet-enabled communication device.

The display system 118 may include a display device 118a which may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 118a may refer to a display of the infotainment head unit, a projection-based display, a see-through display, and/or an electro-chromic display.

The present disclosure refers to certain terms, such as an agent (the autonomous driving agent 102), observations, actions, and states. It should be noted that these terms are known terminologies of a Partially Observable Markov Decision Process (POMDP), which may be used to define the disclosed problem of the human trust-workload calibration for the autonomous driving agent 102. In POMDP, an agent (such as the autonomous driving agent 102) is an actor whose actions affect a state of the environment (i.e. the human user 120) and since the state is partially observable, observations of the environment (i.e. the human user 120) may be needed to form a belief (a probabilistic measure for a state). Actions may be optimally decided based on belief states to calibrate the human trust-workload while the vehicle 104 is in course of a journey.

During operation, the autonomous driving agent 102 may receive the sensor information from one or more sensors, such as the gaze detector 106a, the front facing camera 106b, or the event logger 106c, of the sensor system 106. The sensor information be multimodal information and may include scene information associated with the surrounding environment 114 and human behavioral data associated with the vehicle 104 and the surrounding environment 114. For example, the scene information may include images captured by the front facing camera 106b of an FOV region that covers a drivable area of the surrounding environment 114 up to a certain distance (e.g., 10 meters or more) in front of the vehicle 104. The human behavioral data may include the human inputs in the course of the journey, especially when the autonomous driving agent 102 may be performing complex tasks, such as, but not limited to, passing through intersections, changing lanes, taking complex turns, or parking maneuver.

The autonomous driving agent 102 may determine a set of observations based on the sensor information. For example, the autonomous driving agent 102 may receive event logs associated with the human inputs of the human user 120 from the event logger 106c and may receive the plurality of image frames associated with the scene from the front facing camera 106b. The set of observations may include the human attention information associated with the scene of the surrounding environment 114 and a level of human reliance on the autonomous driving agent 102 as indicated by the human inputs to the autonomous driving agent 102. For example, the autonomous driving agent 102 may determine the human attention information from the received plurality of image frames and may determine the level of human reliance based on the received event logs associated with the human inputs. The human attention information may include information associated with a gaze of the human user 120 on object(s) of the scene in FOV of the human user 120.

The autonomous driving agent 102 may estimate, based on the determined set of observations, a set of belief states for a first state of the human trust on the autonomous driving agent 102 and a second state of human's cognitive workload in course of a journey of the vehicle 104. As the first state of the human trust and the second state of the human's cognitive workload may be partially observable states of the human user 120, the set of belief states may be estimated as a probabilistic measure for such partially observable states. The estimation of the set of belief states is provided in detail, for example, in FIG. 5.

The autonomous driving agent 102 may select, based on the estimated set of belief states, a first value of a set of values for a first action which may be associated with a level of automation transparency between the human user 120 of the vehicle 104 and the autonomous driving agent 102. Herein, the automation transparency may be defined as a descriptive quality of an interface (such as a UI on the display system 118) pertaining to its abilities to afford an operator's (i.e. the human user 120) comprehension about an intelligent agent's (i.e. the autonomous driving agent 102) intent, performance, future plans, and reasoning process.

For example, the set of values may be one of: "0" or "1", where "0" may be for an action of the autonomous driving agent 102 to hide the cue from the display system 118 and "1" may be for another action of the autonomous driving agent 102 to display the cue on the display system 118.

It should be noted that the level of automation transparency may be one of the actions which the autonomous driving agent 102 may be able to control in the course of the journey for the human trust-workload calibration. Other actions which may not be in control of the autonomous driving agent 102, may include, for example, a scene complexity (such as road intersections, traffic, etc.) or automation reliability of the autonomous driving agent 102. Based on the selected first value, the autonomous driving agent 102 may control the display system 118 to display the cue for the calibration of the human trust of the human user 120 on the autonomous driving agent 102. Operations related to the calibration of human trust or human trust-workload are explained in detail, for example, in FIG. 6 and FIGS. 7A, 7B, and 7C.

FIG. 2 is a block diagram of the autonomous driving agent of FIG. 1, in accordance with an embodiment of the disclosure. FIG. 2 is explained in conjunction with elements from FIG. 1. With reference to FIG. 2, there is shown a block diagram 200 of the autonomous driving agent 102. The autonomous driving agent 102 may include circuitry 202, a memory 204, an input/output (I/O) interface 206, and a network interface 208. In at least one embodiment, the autonomous driving agent 102 may also include the display system 118. The network interface 208 may connect the autonomous driving agent 102 to various electronic components of the vehicle 104 or other networking components outside the vehicle (such as a Dedicate Short-Range Communication Channel (DSRC) Roadside Unit (RSU)), via the communication network 110. A person of ordinary skill in the art will understand that the autonomous driving agent 102 may also include other suitable components or systems, in addition to the components or systems illustrated herein to describe and explain the function and operation of the present disclosure. A description of such components or systems is omitted herein for the sake of brevity.

The circuitry 202 may include suitable logic, circuitry, and/or interfaces that may be configured to execute program instructions associated with different operations to be executed by the autonomous driving agent 102. For example, some of the operations may include reception of the sensor information, determination of the set of observations from the sensor information, estimation of a set of belief states, selection of a first value for a first action associated with the level of automation transparency, and the control of the display system 118 to display the cue based on the selected first value.

The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 2, the circuitry 202 may include any number of processors configured to, individually or collectively, perform or direct performance of any number of operations of the autonomous driving agent 102, as described in the present disclosure. Additionally, one or more of the processors may be present on one or more different electronic devices, such as different servers. In some embodiments, the circuitry 202 may be configured to interpret and/or execute program instructions and/or process data stored in the memory 204 and/or a persistent data storage. In some embodiments, the circuitry 202 may fetch program instructions from a persistent data storage and workload the program instructions in the memory 204. After the program instructions are loaded into the memory 204, the circuitry 202 may execute the program instructions. Some of the examples of the circuitry 202 may be a Graphical Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 204 may include suitable logic, circuitry, interfaces, and/or code that may be configured to store the program instructions executable by the circuitry 202. In certain embodiments, the memory 204 may be configured to store operating systems and associated application-specific information. Examples of information stored in the memory 204 may include, but are not limited to, the sensor information, such as the scene information and/or the human behavioral data. The memory 204 may include computer-readable storage media for carrying or having computer-executable instructions or data structures stored thereon. Such computer-readable storage media may include any available media that may be accessed by a general-purpose or a special-purpose computer, such as the circuitry 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM), Hard Disk Drive (HDD), a Solid-State Drive (SSD), a CPU cache, and/or a Secure Digital (SD) card or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 202 to perform a certain operation or a group of operations associated with the autonomous driving agent 102.

The I/O interface 206 may include suitable logic, circuitry, and interfaces that may be configured to receive a user input and provide an output based on the received input. The I/O interface 206 which includes various input and output devices, may be configured to communicate with the circuitry 202. Examples of the I/O interface 206 may include, but are not limited to, a touch screen, a keyboard, a mouse, a joystick, a microphone, a display (such as the display system 118), and a speaker.

The network interface 208 may include suitable logic, circuitry, interfaces, and/or code that may enable communication among the autonomous driving agent 102 and other external devices, such as the vehicle 104 and the server 108, via the communication network 110. The network interface 208 may implement known technologies to support wired and/or wireless communication via the communication network 110. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The functions or operations executed by the autonomous driving agent 102, as described in FIG. 1, may be performed by the circuitry 202. Operations executed by the circuitry 202 are described in detail, for example, in FIG. 6.

FIG. 3 is a block diagram of an exemplary vehicle that implements the autonomous driving agent of FIG. 1, in accordance with an embodiment of the disclosure. FIG. 3 is explained in conjunction with elements from FIG. 1. With reference to FIG. 3, there is shown a block diagram 300 of the vehicle 104. The block diagram 300 of the vehicle 104 may include the autonomous driving agent 102, which may be implemented as part of an In-vehicle Infotainment (IVI) system or as an ECU (which may include at least a microprocessor and/or a memory). The vehicle 104 may further include circuitry 302 as part of the autonomous driving agent 102, the sensor system 106 (which includes the gaze detector 106a, the front facing camera 106b, and the event logger 106c), an in-vehicle display device 304 (as part of the display system 118), and a memory 306 communicatively coupled to the circuitry 302. One or more user interfaces (UIs), such as a UI 304a may be rendered on the in-vehicle display device 304.

The circuitry 302 may communicate with the sensor system 106, via an in-vehicle network 308. The vehicle 104 may further include a network interface 310 that may connect the vehicle 104 to other external devices, such as the server 108, via the communication network 110. A person of ordinary skilled in the art will understand that the vehicle 104 may also include other suitable components or systems, in addition to the components or systems illustrated herein to describe and explain the function and operation of the present disclosure. A description of such components or systems is omitted herein for the sake of brevity.

The circuitry 302 may include suitable logic, circuitry, and/or interfaces that may be configured to execute program instructions associated with different operations to be executed by the autonomous driving agent 102. The circuitry 302 may include any suitable special-purpose or general-purpose computer, computing entity, or processing device including various computer hardware or software modules and may be configured to execute instructions stored on any applicable computer-readable storage media. For example, the circuitry 302 may include a microprocessor, a microcontroller, a DSP, an ASIC, a FPGA, or any other digital or analog circuitry configured to interpret and/or to execute program instructions and/or to process data.

Although illustrated as a single circuitry in FIG. 3, the circuitry 302 may include any number of processors configured to, individually or collectively, perform or direct performance of any number of operations of the autonomous driving agent 102, as described in the present disclosure. Additionally, one or more of the processors may be present on one or more different electronic devices, such as different servers. In some embodiments, the circuitry 302 may be configured to interpret and/or execute program instructions and/or process data stored in the memory 306 and/or a persistent data storage. In some embodiments, the circuitry 302 may fetch program instructions from a persistent data storage and workload the program instructions in the memory 306. After the program instructions are loaded into the memory 306, the circuitry 302 may execute the program instructions. Some of the examples of the circuitry 302 may be a GPU, a CPU, a RISC processor, an ASIC processor, a CISC processor, a co-processor, and/or a combination thereof.

The in-vehicle display device 304 may include suitable logic, circuitry, interfaces, and/or code that may be configured to render various types of information and/or viewable content via the UI 304a. The UI 304a may be a customizable or a non-customizable Graphical UI that may display various types of information related to the autonomous driving agent 102. For example, the UI 304a may display a visual representation of the surrounding environment 114, such as images or a video of a scene of the surrounding environment 114 and a cue overlaid over object(s) detected in the visual representation. In an embodiment, the cue may correspond to an Augmented-Reality (AR) cue, such as AR bounding boxes on the object(s), or color indicators to classify the object(s). Examples of the in-vehicle display device 304 may include, but are not limited to, a display of the infotainment head unit, a projection-based display, a see-through display, and/or an electro-chromic display. In an embodiment, the in-vehicle display device 304 may be implemented as one of, but not limited to, MID, an automotive HUD, or an instrument cluster.

The memory 306 may include suitable logic, circuitry, interfaces, and/or code that may be configured to store the program instructions executable by the circuitry 302. In certain embodiments, the memory 306 may be configured to store operating systems and associated application-specific information. Examples of information stored in the memory 306 may include, but are not limited to, the sensor information (such as, the plurality of image frames from the front facing camera 106b, the scene information, information that includes event logs associated with the human inputs of the human user 120), and the human attention information associated with human user 120. The functions of the memory 306 may be same as the functions of the memory 204 described, for example, in FIG. 2. Therefore, further description of the memory 306 is omitted from the disclosure for the sake of brevity.

The in-vehicle network 308 may include a medium through which the various control units, components, and/or systems of the vehicle 104 may communicate with each other. In accordance with an embodiment, in-vehicle communication of audio/video data may occur by use of Media Oriented Systems Transport (MOST) multimedia network protocol of the in-vehicle network 308 or other suitable network protocols for vehicle communication. The MOST-based network may be a separate network from the controller area network (CAN). In accordance with an embodiment, the MOST-based network, the CAN, and other in-vehicle networks may co-exist in the vehicle 104. The in-vehicle network 308 may facilitate access control and/or communication among the circuitry 302 of the autonomous driving agent 102, the sensor system 106, the network interface 310, OBUs, and other ECUs, such as Engine Control Module (ECM) or a telematics control unit (TCU) of the vehicle 104.

Various devices or components in the vehicle 104 may connect to the in-vehicle network 308, in accordance with various wired and wireless communication protocols. Examples of the wired and wireless communication protocols for the in-vehicle network 308 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The network interface 310 may include suitable logic, circuitry, interfaces, and/or code that may enable communication among the vehicle 104 and other external devices, such as the server 108, via the communication network 110. The network interface 310 may implement known technologies to support wired and/or wireless communication via the communication network 110. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The functions of network interface 310 may be same as the functions of the network interface 208 described, for example, in FIG. 2. Therefore, further description of the network interface 310 is omitted from the disclosure for the sake of brevity.

It should be noted that some or all of the functions and/or operations performed by the circuitry 202 (as described in FIG. 2) may be performed by the circuitry 302, without a deviation from the scope of the disclosure.

Figure 4:
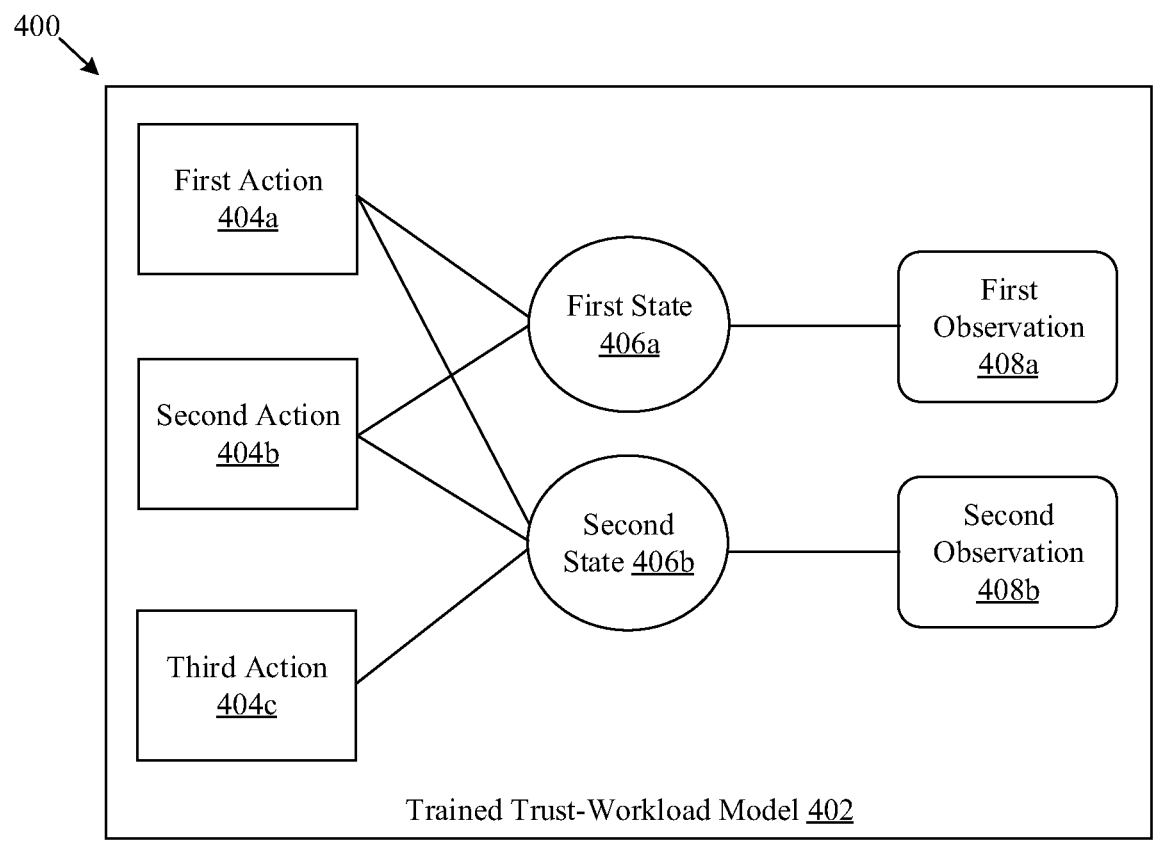
FIG. 4 is a diagram that illustrates an exemplary trust-workload model for calibration of human trust on the autonomous driving agent of FIG. 1, in accordance with an embodiment of the disclosure.

FIG. 4 is a diagram that illustrates an exemplary trust-workload model for calibration of human trust on the autonomous driving agent of FIG. 1, in accordance with an embodiment of the disclosure. FIG. 4 is explained in conjunction with elements from FIG. 1, 2, or 3. With reference to FIG. 4, there is shown a diagram 400 of a trained trust-workload model 402. The trained trust-workload model 402 may include a first action 404a, a second action 404b, and a third action 404c (collectively referred to as a set of actions 404). The trained trust-workload model 402 may further include a first state 406a and a second state 406b (collectively referred to as a set of states 406). Further, the trained trust-workload model 402 may include a first observation 408a and a second observation 408b (collectively referred to as a set of observations 408).

The trained trust-workload model 402 may be a POMDP model, where each of the set of states 406 of the trained trust-workload model 402 may be measured by a belief state. Therefore, a set of belief states associated with the set of states 406 may include a first belief state for the first state 406a and a second belief state for the second state 406b. Herein, the first state 406a may be for human trust on the autonomous driving agent 102 and the second state 406b may be for human's cognitive workload (also referred to as workload) in the course of journey. The first belief state may include a first probabilistic measure to observe the first state 406a of the human trust. Similarly, the second belief state may include a second probabilistic measure to observe the second state 406b of the human's cognitive workload.

Interaction with the autonomous driving agent 102 (e.g., in a level 2 driving automation) may be characterized by human's reliance, or lack thereof, on the autonomous driving agent 102. There may be an associated eye-gaze behavior (as part of the human attention information) which may correspond to the human's supervision of the autonomous driving agent 102 when in the course of journey. It may be assumed that characteristics of human behavior, i.e., human's reliance on the autonomous driving agent 102 or attention (measured by gaze behavior) may be dependent on the human trust and the workload (i.e. also referred to as the human's cognitive workload). Furthermore, the human trust and the workload may be influenced by characteristics of the automation transparency, the automation reliability as well as the scene complexity (as measured from the surrounding environment 114). It may be further assumed that dynamics of the human trust and the workload may follow the Markov property, and therefore, human trust-workload behavior may be modelled as a POMDP model (such as the trained trust-workload model 402).

As the human trust and the workload cannot be directly observed, the trained trust-workload model 402 may define the set of states 406 consisting of tuples of the first state 406a of the human trust and the second state 406b of the human's cognitive workload. The first state 406a can either be Low Trust or High Trust. Similarly, the second state 406b of the human's cognitive workload can either be Low Workload or High Workload. As the set of states 406 may be influenced by characteristics of the autonomous driving agent 102 and the surrounding environment 114, the trained trust-workload model 402 may define the set of actions 404 consisting of tuples of the first action 404a associated with the automation transparency, the second action 404b associated with the automation reliability, and the third action 404c associated with the scene complexity. Observable characteristics of the human user 120 may be defined as the set of observations 408 consisting of the first observation 408a associated with the human reliance on the autonomous driving agent 102 and the second observation 408b associated with the human's attention information (includes gaze position).

The set of actions 404 may include a set of controllable actions and a set of uncontrollable actions. The set of controllable actions may include the first action 404a that may be associated with a level of the automation transparency between the human user 120 of the vehicle 104 and the autonomous driving agent 102. For example, the first action 404a may correspond to a decision to display a type of information by the autonomous driving agent 102 in the form of cues via the display system 118 in the course of the journey.

The set of uncontrollable actions may include the second action 404b and the third action 404c. The second action 404b may be associated with the automation reliability on the autonomous driving agent 102 in the course of the journey. The automation reliability may be defined at an intersection in terms of the distance up to which the autonomous driving agent 102 may stop the vehicle 104 before a stop line. The automation reliability may be defined to be low (reliance low) if the vehicle 104 stops before a first threshold distance (such as 5 meters) from the stop line or crosses the stop line. The reliability may be defined to be medium (reliance medium) if the vehicle 104 stops between the first threshold distance (such as 5 meters) and a second threshold distance (such as 15 meters) before the stop line. The reliability may be defined to be high (reliance high) if the vehicle 104 stops more than the second threshold distance (such as 15 meters) away from the stop line. Such a reliability definition may be similar to driving aggressiveness, which affects the perceived trustworthiness of the autonomous driving agent 102.

The third action 404c associated with the autonomous driving agent 102 may be defined as the scene complexity. The scene complexity may be characterized by both traffic density (traffic low or traffic high) and intersection complexity (pedestrians absent or pedestrians present). The scene complexity may be determined from the scene information (for example, images acquired from the front facing camera 106b). For example, a low complexity scene may include a vehicle-only or a pedestrian-only scenario on a road intersection. Whereas a high complexity scene may include a combination of one or more vehicles and one or more pedestrians on the road intersection.

The first observation 408a may be associated with a level of human reliance on the autonomous driving agent 102. The level of human reliance may correspond to one of: a human takeover of controls of the vehicle 104 by the human user 120 or a takeover of the controls of the vehicle 104 by the autonomous driving agent 102. Similarly, the second observation 408b may be associated with the human attention information associated with a scene of the surrounding environment 114 of the vehicle 104. For example, the human attention information may include datapoints, such as a human gaze on an object of a certain type in the scene of the surrounding environment. The position of the human gaze may be classified as belonging to one of: road, vehicle, pedestrian, a sidewalk, or others in each image frame collected by the gaze detector 106a and/or the front facing camera 106b.

The first state 406a of the human trust and the second state 406b of the human's cognitive workload may be coupled and may influence the use of the autonomous driving agent 102. Modeling the first state 406a and the second state 406b as coupled states at a given time presents several challenges. Among these challenges is the difficulty of explicitly distinguishing individual trust and workload states after model parameterization. In order to overcome this, it may be assumed that at any given time, the human trust and the human's cognitive workload are independent but that the human trust and the human's cognitive workload at current time affect a next state of the human trust as well as a next state of the human's cognitive workload. In this way, the trained trust-workload model 402 may capture dynamics between the human trust and the human's cognitive workload as they evolve over time. Furthermore, it may be assumed that the human trust only affects reliance and the human's cognitive workload only affects the human attention, such as the gaze position. This may enable the first state 406a of the human trust and the second state 406b of the human's cognitive workload to be identified based respective emission probabilities. These assumptions significantly reduce a number of model parameters and in turn, the amount of data needed to estimate them. They also result in separate transition probability functions for the human trust and the human's cognitive workload, as well as independent emission probability functions for reliance, and human attention (such as in terms of gaze position).

The first action 404a (associated with the level of automation transparency) and the second action 404b (associated with the automation reliability) may affect the first state 406a of the human trust. The first observation 408a associated with the level of human reliance on the autonomous driving agent 102 may indicate an effect of the first action 404a and the second action 404b on the first state 406a (measured by the first belief state) of the human trust on the autonomous driving agent 102 of the vehicle 104. Also, the first action 404a associated with the level of automation transparency, the second action 404b associated with the automation reliability, and the third action 404c associated with the scene complexity may affect the second state 406b of the human's cognitive workload in the course of the journey. The second observation 408b may be associated with the human attention information may indicate the effect of the first action 404a, the second action 404b, and the third action 404c on the second state 406b (measured by the second belief state) of the human's cognitive workload in the course of journey.

The autonomous driving agent 102 may use the trained trust-workload model 402 to optimally select a first value for the first action 404a associated a level of the automation transparency between the human user 120 and the autonomous driving agent 102. Depending on the selected first value, it may be decided whether to display cue(s) on the display system 118 for a current set of belief states and past actions associated with the autonomous driving agent 102.

Figure 5:
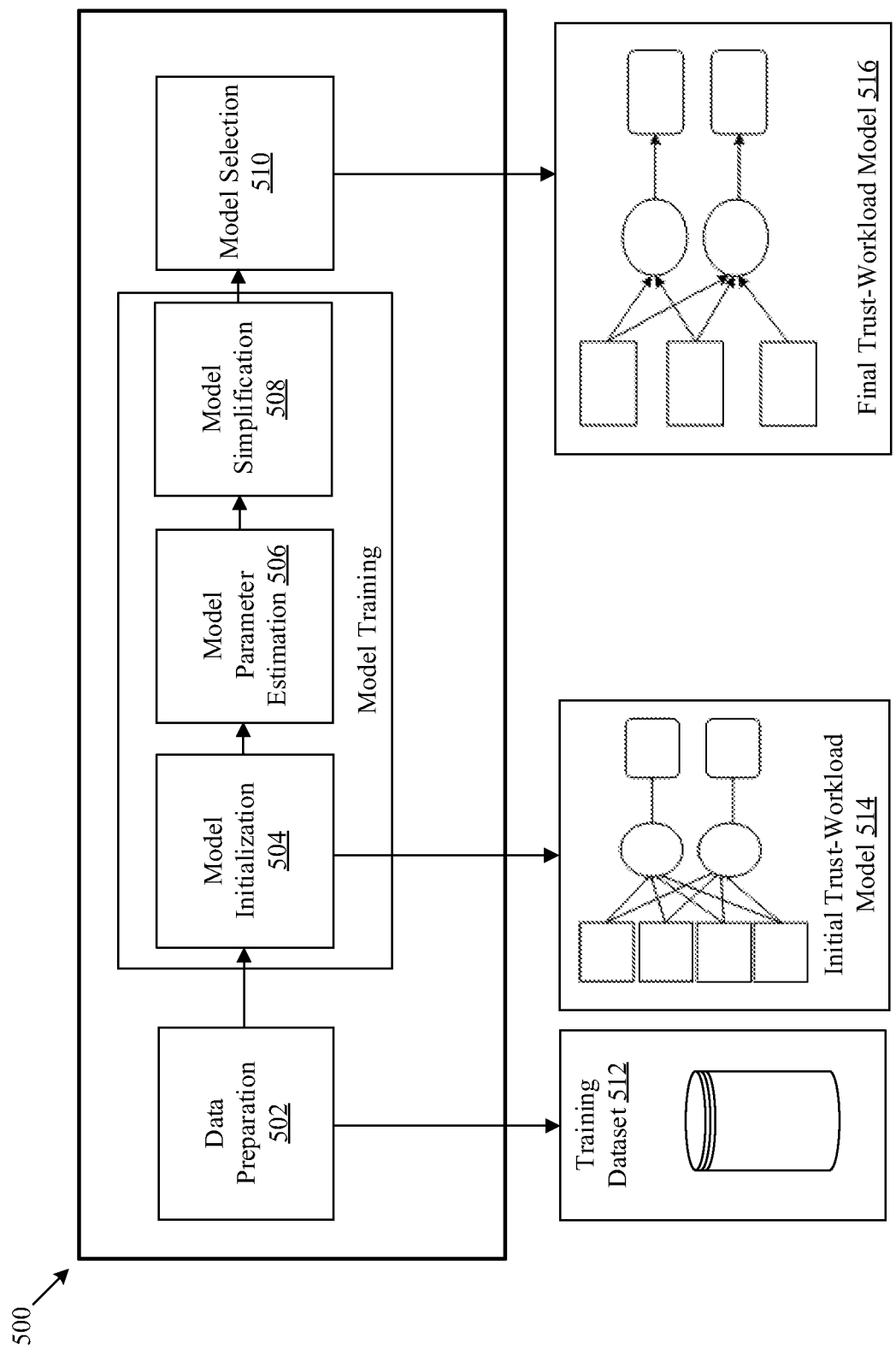
FIG. 5 is a diagram that illustrates exemplary operations for training the exemplary trust-workload model of FIG. 4, in accordance with an embodiment of the disclosure.

FIG. 5 is a diagram that illustrates exemplary operations for training the exemplary trust-workload model of FIG. 4, in accordance with an embodiment of the disclosure. FIG. 5 is explained in conjunction with elements from FIGS. 1, 2, 3, and 4. With reference to FIG. 5, there is shown a diagram 500 to depict exemplary operations from 502 to 510 for training a trust-workload model, which when deployed on the autonomous driving agent 102, may enable the autonomous driving agent 102 to calibrate the human trust of the human user 120 on the autonomous driving agent 102. The exemplary operations illustrated in the diagram 500 may start at 502 and may be performed by any computing system, apparatus, or device, such as by the server 108 of FIG. 1. Although illustrated with discrete blocks, the operations associated with one or more of the blocks of the diagram 500 may be divided into additional blocks, combined into fewer blocks, or eliminated, depending on the particular implementation.

At 502, data preparation may be performed. For data preparation, the server 108 may generate a training dataset 512 for an initial trust-workload model 514. For example, the server 108 may generate the training dataset 512 based on information which may include a sequence of action-observation data for each human test subject as an interaction sequence at each intersection. The sequence of action-observation data may be acquired based on a visual attention, and human reliance or take-over information (e.g., vehicle steering/acceleration control take-over or a human non-intervention) from the respective human subject while the human test subject uses a simulated or real autonomous test driving system.

For example, the training dataset 512 may include datapoints of 16 participants (i.e., human test subjects) for 8 (i.e., 2×2×2) drive conditions each. The 8 drive conditions may include 2 levels of AR presentations (i.e., annotated and un-annotated), 2 levels of traffic density (i.e., low traffic and high traffic), and 2 levels of intersection complexity (i.e., vehicle only or a combination of vehicles and pedestrians). Further, the training dataset 512 may include information related to physiological responses of the human test subjects (e.g., eye-tracking data) and behavioral responses of the human test subjects (e.g., steering and braking/acceleration takeover responses). In addition, the training dataset 512 may include 3 levels of driving automation reliability (i.e., low, medium, and high).

At 504, trust-workload model may be initialized. For model initialization, the server 108 may define a structure of the initial trust-workload model 514 as a set of nodes. The set of nodes of the initial trust-workload model 514 may include input nodes, intermediate nodes, and output nodes. As dynamics of the human trust and human's cognitive workload (also referred to as workload) may follow the Markov property, the initial trust-workload model 514 may be modelled for the human trust-workload behavior as a POMDP model. As a POMDP, the initial trust-workload model 514 may include a set of actions (i.e., as the input nodes), a set of states (i.e., as the intermediate nodes), and a set of observations (i.e., as the output nodes). The input nodes may denote the automation transparency, the automation reliability, the scene complexity (in terms of traffic density and/or intersection complexity) as the set of actions. The intermediate nodes of the initial trust-workload model 514 may include a first state to represent human trust on the simulated or real autonomous test driving system and a second state to represent the human's cognitive workload during a course of a test journey. The output nodes may denote a level of human reliance on the simulated or real autonomous test driving system and human attention information (based on the eye-gaze) of the human test subjects.

The server 108 may define the structure of the initial trust-workload model 514 as an association between the set of nodes. For example, in the initial trust-workload model 514, each input node (action) may be associated with each intermediate node (state). Output nodes (observations) may be associated with each respective intermediate node.

By way of example, and not limitation, the inputs of the initial trust-workload model 514 may be determined as automation transparency (i.e., an AR presentation level), the automation reliability, or the scene complexity. The server 108 may also determine outputs of the initial trust-workload model 514 as human reliance (i.e., a behavioral response) on autonomation and human attention information (e.g., measured in terms of eye-gaze behavior, i.e., a physiological response) of the human test subjects on object type(s) present in the scene surrounding a test vehicle. The reliance may be represented by a discrete value including one of a takeover of vehicle controls (i.e., simulated vehicle driver controls in this case) by the human test subject or a takeover of the vehicle controls by the simulated or real autonomous test driving system. Similarly, the eye-gaze may be represented by an object type on which an eye gaze of the human test subject may be detected. For example, the object type may include a road, a sidewalk, a pedestrian, a vehicle, smartphone, in-vehicle objects, sky, or any other objects (e.g., buildings).

At 506, model parameters may be estimated. Before estimation of parameters, it may be assumed that the human trust and cognitive workload are independent of each other, as given by equation (1), as follows:

$$P(\text{Trust, Workload}) = P(\text{Trust}) \times P(\text{Workload}) \quad (1)$$

Where,

Trust may represent the state of the human trust on the autonomation; and

Workload may represent the human's cognitive workload during course of the journey of the test vehicle.

To estimate parameters of the initial trust-workload model 514 using the training dataset 512, an optimization problem may be formulated and solved to maximize the likelihood of observing sequences of observations for given sequences of actions. The Baum-Welch algorithm is typically used to address a similar problem for estimating hidden Markov models (HMMs). However, HMMs lack the notion of actions; therefore, for estimating the parameters of the initial trust-workload model 514, a modified version of the Baum-Welch algorithm that accounts for actions along with state and observation independence assumptions may be used.

The Baum-Welch technique may include the use of an Expectation-Maximization (EM) optimization technique with a forward-backward algorithm on the training dataset 512 to estimate the parameters of the initial trust-workload model 514. For example, a 1000-point multi-start EM optimization may be performed to detect a global optima and avoid a local minima of the parameters.

At 608, model simplification may be performed. The server 108 may determine an action space associated with possible values of actions. For example, the server 108 may determine an action space cardinality associated with the training dataset 512 as 26. The set of possible actions for such an action space cardinality of 26 is provided in Table 1, as follows:

TABLE 1

Set of possible actions associated with the training dataset 512

| Action Set | Details |
| --- | --- |
| Road_AR-OFF | Road without vehicle/pedestrian, AR "OFF" |
| Road_AR-ON | Road without vehicle/pedestrian, AR "ON" |

TABLE 1-continued

Set of possible actions associated with the training dataset 512

| Action Set | Details |
|---|---|
| LT_VO_rel-LOW_AR-OFF | Low traffic, vehicle only, low reliability, AR "OFF" |
| LT_VO_rel-LOW_AR-ON | Low traffic, vehicle only, low reliability, AR "ON" |
| LT_VO_rel-MED_AR-OFF | Low traffic, vehicle only, medium reliability, AR "OFF" |
| LT_VO_rel-MED_AR-ON | Low traffic, vehicle only, medium reliability, AR "ON" |
| LT_VO_rel-HIGH_AR-OFF | Low traffic, vehicle only, high reliability, AR "OFF" |
| LT_VO_rel-HIGH_AR-ON | Low traffic, vehicle only, high reliability, AR "ON" |
| LT_VP_rel-LOW_AR-OFF | Low traffic, vehicle/pedestrian, low reliability, AR "OFF" |
| LT_VP_rel-LOW_AR-ON | Low traffic, vehicle/pedestrian, low reliability, AR "ON" |
| LT_VP_rel-MED_AR-OFF | Low traffic, vehicle/pedestrian, medium reliability, AR "OFF" |
| LT_VP_rel-MED_AR-ON | Low traffic, vehicle/pedestrian, medium reliability, AR "ON" |
| LT_VP_rel-HIGH_AR-OFF | Low traffic, vehicle/pedestrian, high reliability, AR "OFF" |
| LT_VP_rel-HIGH_AR-ON | Low traffic, vehicle/pedestrian, high reliability, AR "ON" |
| HT_VO_rel-LOW_AR-OFF | High traffic, vehicle only, low reliability, AR "OFF" |
| HT_VO_rel-LOW_AR-ON | High traffic, vehicle only, low reliability, AR "ON" |
| HT_VO_rel-MED_AR-OFF | High traffic, vehicle only, medium reliability, AR "OFF" |
| HT_VO_rel-MED_AR-ON | High traffic, vehicle only, medium reliability, AR "ON" |
| HT_VO_rel-HIGH_AR-OFF | High traffic, vehicle only, high reliability, AR "OFF" |
| HT_VO_rel-HIGH_AR-ON | High traffic, vehicle only, high reliability, AR "ON" |
| HT_VP_rel-LOW_AR-OFF | High traffic, vehicle/pedestrian, low reliability, AR "OFF" |
| HT_VP_rel-LOW_AR-ON | High traffic, vehicle/pedestrian, low reliability, AR "ON" |
| HT_VP_rel-MED_AR-OFF | High traffic, vehicle/pedestrian, medium reliability, AR "OFF" |
| HT_VP_rel-MED_AR-ON | High traffic, vehicle/pedestrian, medium reliability, AR "ON" |
| HT_VP_rel-HIGH_AR-OFF | High traffic, vehicle/pedestrian, high reliability, AR "OFF" |
| HT_VP_rel-HIGH_AR-ON | High traffic, vehicle/pedestrian, high reliability, AR "ON" |

A person having ordinary skill in the art will understand that the set of possible actions associated with the training dataset 512 (as shown in Table 1) are merely provided as an example and should not be construed as limiting for the scope of the disclosure.

Not all actions from the set of possible actions may affect the set of states. Therefore, to obtain a final trust-workload model 516 (i.e. the trained trust-workload model 402 of FIG. 4) with a best generalizability for the training dataset 512, a subset of actions that directly affect trust and workload dynamics may be determined from the set of possible actions and a possible trust-workload model with the determined subset of action for the human trust and the workload may be trained. Similarly, other possible trust-workload models may be trained with different subsets of action for the human trust and the workload. It may be assumed that the action "automation reliability" may be selected as a default action that may affect the first state of the human trust.

At 510, model selection may be performed. The server 108 may select a trained trust-workload model as the final trust-workload model 516 (i.e. the trained a trust-workload model 402) from all possible trust-workload models trained at 508. For such selection, the server 108 may perform a 3-fold cross validation of each possible trust-workload model (trained at 508). For example, the server 108 may perform 24 iterations for all the possible trust-workload models based on a similar distribution of data associated with the human test subjects in the training dataset 512 and trails across the folds. Multiple iterations may be useful in reduction of the uncertainty associated with the cross validation.

In an embodiment, the server 108 may select the final trust-workload model 516 based on an Akaike Information Criterion (AIC) score calculated for each of the possible trust-workload models. The server 108 may use the AIC score to test a fitness of each possible trust-workload model with the training dataset 512 to select a best fitting model as the final trust-workload model 516. The AIC score for all the possible trust-workload models may be minimized such that the trust-workload model with the maximum value of the AIC score (or the highest likelihood) may be selected as the final trust-workload model 516 (or the trained trust-workload model 402 of FIG. 4). The server 108 may determine the AIC scores for each of the possible trust-workload models using equation (2), given as follows:

$$AIC\ score = 2k - 2\ \log_e(L) \quad (2)$$

Where,
k may represent a number of parameters (variables in plus an intercept) of a trust-workload model; and
L may represent a likelihood value of the trust-workload model.

The final trust-workload model 516 may include an initial probability for the first state of the human trust ($\pi(S_T)$) and an initial probability for the second state of the human's cognitive workload ($\pi(S_W)$). The final trust-workload model 516 may further include emission probability functions $\epsilon_T(O_R, S_T)$ and $\epsilon_W(O_G, S_W)$ for the level of human reliance on the simulated or real autonomous test driving system and for the human attention information, respectively. Further, the final trust-workload model 516 may include transition probability functions $T_T(S'_T | S_T, S_W, a)$ and $T_W(S'_W | S_T, S_W, a)$ for transition of the first state of the human trust and the second state of the human's cognitive workload, respectively, from a current value to a future value.

Figure 6:
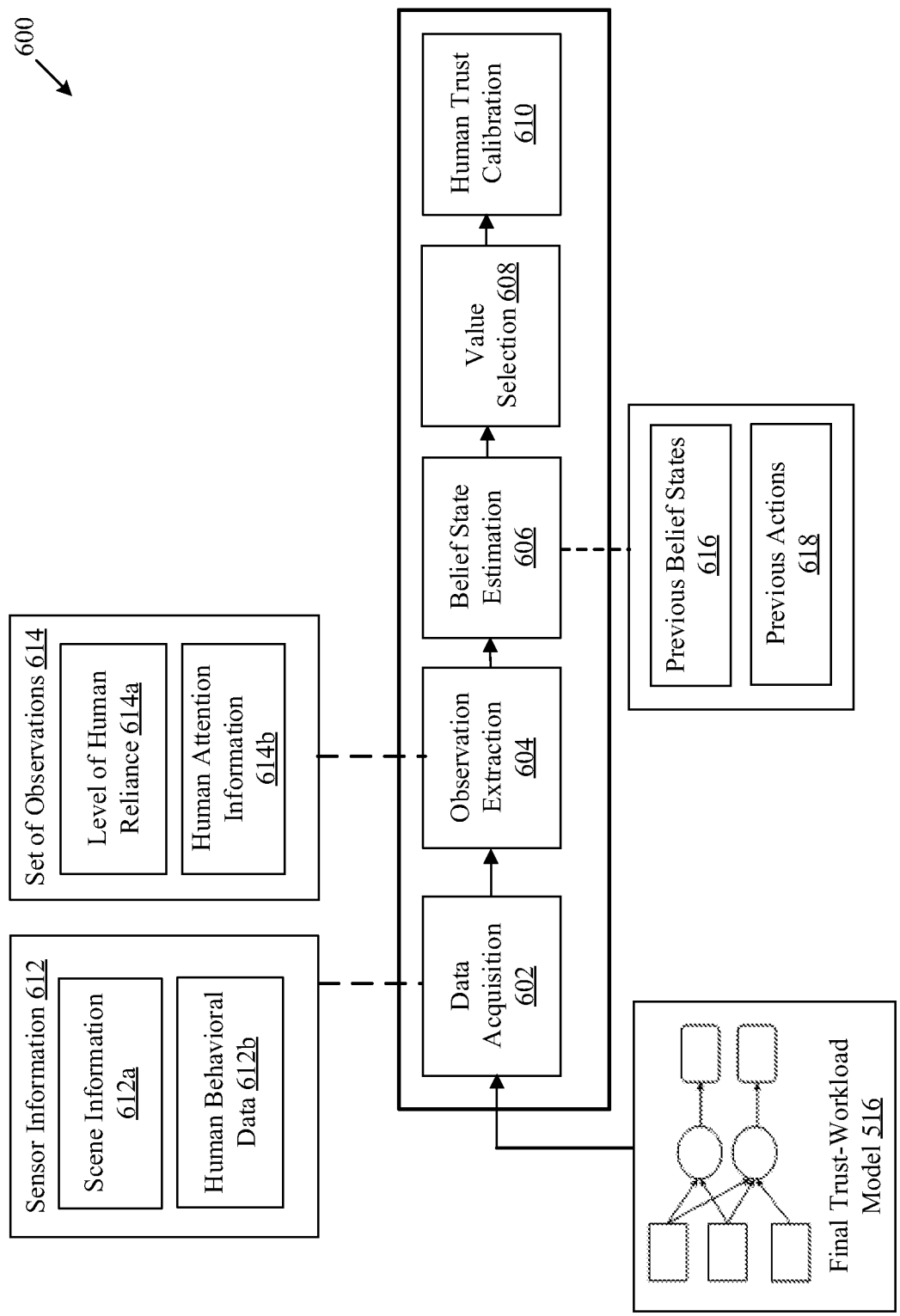
FIG. 6 is a diagram that illustrates exemplary operations for human trust calibration for the autonomous driving agent of FIG. 1, in accordance with an embodiment of the disclosure.

FIG. 6 is a diagram that illustrates exemplary operations for human trust calibration for the autonomous driving agent of FIG. 1, in accordance with an embodiment of the disclosure. FIG. 6 is explained in conjunction with elements from FIGS. 1, 2, 3, and 4. With reference to FIG. 6, there is shown a diagram 600 that depicts exemplary operations from 602 to 610 for calibration of human trust on the autonomous driving agent 102 of FIG. 1. The exemplary operations illustrated in the diagram 600 may start at 602 and may be performed by any computing system, apparatus, or device, such as by the autonomous driving agent 102 of FIG. 1, FIG. 2, or FIG. 3. In order to calibrate the human trust at all time-steps in the course of journey, the operations from 602 to 610 may be iteratively performed for every time-step in the course of the journey. Also, the trained trust-workload model 402 of FIG. 4 or the final trust-workload model 516 of FIG. 5 may be deployed on the autonomous driving agent 102. Although illustrated with discrete blocks, the operations associated with one or more of the blocks of the diagram 600 may be divided into additional blocks, combined into fewer blocks, or eliminated, depending on the particular implementation.

At 602, data acquisition may be performed. For the data acquisition, the autonomous driving agent 102 may receive sensor information 612 from the sensor system 106. The sensor information 612 may include scene information 612a associated with the surrounding environment 114 and human behavioral data 612b associated with the vehicle 104 and the surrounding environment 114. As an example, the event logger 106c of the sensor system 106 may log events associated with human inputs received from the human user 120 to the autonomous driving agent 102. The human inputs may correspond to a takeover of one or more vehicle controls of the vehicle 104 by the human user 120. Additionally, the event logger 106c may log events where the autonomous driving agent 102 takes over the one or more vehicle controls of the vehicle 104 for autonomous driving of the vehicle 104. The event logger 106c may store the events associated with the human inputs as part of the human behavioral data 612b in the memory 204 (or the memory 306). As another example, the front facing camera 106b may capture a plurality of image frames of a scene of the surrounding environment 114. At the same time, the gaze detector 106a may capture an image of a face of the human user 120. The captured plurality of image frames and the captured image of the face may be stored as part of the scene information 612a in the memory 204 (or the memory 306).

At 604, observations may be extracted. The autonomous driving agent 102 may extract a set of observations 614 based on the received sensor information 612. The set of observations 614 may include a level of human reliance 614a (that may correspond to the first observation 408a of FIG. 4) and human attention information 614b (that may correspond to the second observation 408b of FIG. 4).

By way of example, and not limitation, the level of human reliance 614a may correspond to one of a takeover of the one or more vehicle controls of the vehicle 104 by the human user 120 or a takeover of the one or more vehicle controls of the vehicle 104 by the autonomous driving agent 102 for the autonomous driving of the vehicle 104. The autonomous driving agent 102 may determine the level of human reliance 614a based on the human behavioral data 612b included in the sensor information 612 and acquired from the event logger 106c. For example, the level of human reliance 614a may be determined to have a "HIGH" value in case the human user 120 does not take over any control of the vehicle 104, while the vehicle 104 is autonomously controlled by the autonomous driving agent 102. Alternatively, the level of human reliance 614a may be determined to have a "LOW" value in case the human user 120 takes over control of the vehicle 104 at multiple instances while the vehicle 104 is autonomously controlled by the autonomous driving agent 102. Such instances may include the human user 120 taking over one or more of a steering control and/or a braking/acceleration control of the vehicle 104 in the course of the journey.

By way of example, and not limitation, the human attention information 614b may include a human gaze on an object type present in a scene of the surrounding environment 114. Examples of the object may include, but are not limited to, a vehicle, a pedestrian, a side-walk, a road portion, or any other type of objects (such as a building, smartphone, sky, or other objects inside or outside of the vehicle 104). The autonomous driving agent 102 may detect the human gaze on the object type based on application of Tobii's attention filter on the scene information 612a included in the sensor information 612.

At 606, belief states may be estimated. The autonomous driving agent 102 may estimate a set of belief states which may include a first belief state and a second belief state. The first belief state may be for a first state (e.g., the first state 406a) of the human trust on the autonomous driving agent 102. The second belief state may be for a second state (e.g., the second state 406b) of the human's cognitive workload during the course of journey of the vehicle 104. Each of the first belief state and the second belief state may be a probabilistic measure of the first state and the second state, respectively, as modeled by the trained trust-workload model 402.

In an embodiment, the autonomous driving agent 102 may estimate the set of belief states based on the set of observations 614. The estimation of the set of belief states may be further based on a set of previous belief states 616 of the autonomous driving agent 102 and a set of previous actions 618 of the autonomous driving agent 102 associated with the set of previous belief states 616. For the first state and the second state, the set of belief states may be estimated by solving a conditional probability distribution function in which the set of previous belief states 616, the set of previous actions 618, and the set of observations 614 may be input variables. For example, the estimation of the set of belief states may be based on a conditional probability distribution function, which is given by equation (3), as follows:

$$b(s') = P(s' \mid o, a, b(s)) = \frac{P(o, s', a) \times \sum_{s \in S} P(s' \mid s, a) \times b(s)}{\sum_{s \in S} P(o \mid s', a) \times \sum_{s \in S} P(s' \mid s, a) \times b(s)} \quad (3)$$

Where,
S may represent a set of all states;
s may represent a (previous) state from the set of states;
b(s) may represent a previous belief state for the state "s";
s' may represent a current state;
b(s') may represent a current belief state for the state "s";
o may represent an observation;
a may denote an action; and
P(.) may denote a probability function.

At 608, value selection may be performed. The autonomous driving agent 102 may select, from a set of values, a first value for a first action (e.g., the first action 404a) associated with the level of automation transparency between the human user 120 and the autonomous driving agent 102. By way of example, and not limitation, the set of values may be for two levels of the automation transparency and may include an ON value and an OFF value. While the ON value may correspond to a first setting of the display system 118 to display a cue, the OFF value may correspond to a second setting of the display system 118 to hide the cue. The cue may include visual markers for objects which may be present in a scene of the surrounding environment 114. The cue may indicate an extent by which the autonomous driving agent 102 intends to perform, performs, plans actions, reasons, or understands the scene complexity of the surrounding environment 114. For example, the cue may include bounding boxes or text labels around objects on road or in vicinity of the road in images captured by the front facing camera.

By way of another example, and not limitation, the first value may be selected from a set of values ($\tau$), which may be represented by (4), as follows:

$$\tau \in \{AR\ ON, AR\ OFF\} \quad (4)$$

Where, $\tau$ may represent the set of values for the first action associated with the level of automation transparency;

AR ON may represent a display setting for the display system 118 to render AR cue(s) or annotation(s); and AR OFF may represent a display setting for the display system 118 to hide or disable AR cue(s) or annotation(s).

Although, the present disclosure discusses two levels of the automation transparency; however, the present disclosure may be applicable to more than two levels of the automation transparency with multiple modalities of presentation, such as three levels of transparency based on the Situational Awareness Transparency (SAT) framework. Additional factors that influence the scene complexity and the automation reliability, such as weather conditions or lane keeping behavior may also be considered to decide the multiple modalities of the presentation.

The final trust-workload model 516 (or the trained trust-workload model 402) may provide the ability to measure trust and workload levels of the human user 120 continuously, and in real or near real time, using belief state estimates. In order to calibrate the human trust, a reward function may be defined as a function of the first state of the human trust and the automation reliability. A penalty (e.g., −1) may be allotted when the final trust-workload model 516 predicts that the human user 120 is in a state of high trust, given a low automation reliability or when it predicts that the human user 120 is in a state of low trust, given a high automation reliability. A reward (e.g., +1) may be allotted when the final trust-workload model 516 predicts that the human user 120 is in a state of high trust, given the high automation reliability and when it predicts the human user 120 is in a state of low trust, given the low automation reliability. A discount factor may be selected such that the reward after one second (1 seconds) may carry a weight of $e^{-1}$, given 25 time steps per second. With the reward function and the discount factor, a control policy may be applied to select the first value for the first action associated with the level of automation transparency.

In at least one embodiment, the first value for the first action may be selected from the set of values based on a maximization of the reward function. The reward function may be included in the control policy for the human trust calibration. For example, the control policy for the human trust calibration may be defined for the first state (e.g., the first state 406a) of the human trust and the second action (e.g., the second action 404b) associated with the level of automation reliability. In such a case, the objective of the control policy may be to avoid a low human trust on the autonomous driving agent 102 during a high automation reliability and avoid a high human trust on the autonomous driving agent 102 during a low automation reliability. Exemplary values (1.0, −1, 0) of the reward function are presented in Table 2, as follows:

TABLE 2

Reward and penalty values

| | Low Automation Reliability | Medium Automation Reliability | High Automation Reliability |
|---|---|---|---|
| Low Human Trust | 1.0 | 0.0 | −1.0 |
| High Human Trust | −1.0 | 0.0 | 1.0 |

These exemplary values are for different combinations of values of the first state of the human trust (i.e. Low Human Trust and for High Human Trust) and different values of the level of automation reliability (I.e. Low Automation Reliability, Medium Automation Reliability, and High Automation Reliability). A person having ordinary skill in the art will understand that above values of the reward function (as shown in Table 2) are merely provided as an example and should not be construed as limiting for the disclosure.

In at least one embodiment, the autonomous driving agent 102 may use Q-MDP method to obtain a near-optimal solution for the selection of the first value. In order to account for the set of uncontrollable actions (i.e. the automation reliability and the scene complexity, as also discussed in FIG. 4) that cannot be explicitly changed by the autonomous driving agent 102, an expected Q-function may be solved by considering probabilities of the set of uncontrollable actions In an embodiment, the autonomous driving agent 102 may use the $Q_{MDP}$ method to select the first value of the first action. The $Q_{MDP}$ method may be denoted by (5), as follows:

$$Q_{MDP}: S \times A \rightarrow R \quad (5)$$

Where,
S may represent the set of states;
A may represent set of actions; and
R may be reward values of the reward function.
Using (5), an objective function may be formulated, as given by an equation (6), as follows:

$$a^* = \mathrm{argmax}_a \sum_{s \in S} b(s) \times Q_{MDP}(s, a) \quad (6)$$

where,
a* may represent the selected first value of the first action a;
S may represent the set of states; and
b(s) may represent a current belief state that may be determined based on b(s') of equation (3). The autonomous driving agent 102 may select the first value of the first action by solving the equation (6).

In at least one embodiment, the autonomous driving agent 102 may solve the expected Q-function for the set of uncontrollable actions. For example, the autonomous driving agent 102 may determine a near-optimal value for the level of automation transparency by solving the expected Q-function ($Q^T$) of a form, which may be represented by (7), as follows:

$$Q^T: S \times \tau \rightarrow R \quad (7)$$

In order to solve for the Q-MDP function of equation (3), a set of equations represented by (8), (9), and (10) may be iteratively solved. The set of equations are given as follows:

$$Q_{MDP}(s, a) = \sum_{s' \in S} T(s' \mid s, a) \times (R(s' \mid s, a) + \gamma \times V(s')) \quad (8)$$

-continued $$Q^T(s, T) = \sum_{a_u \in A_u} P(a_u) \times Q_{MDP}(s, a = [a_u, T]) \quad (8)$$

$$V(s) = \max_T Q^T(s, T) \quad (10)$$

Where,
s' may represent the current state;
s may represent the previous state;
S may represent the set of states;
au may represent an uncontrollable action a;
Au may represent the set of all uncontrollable actions;
T(.) may represent a transition probability function for transition of a state from the previous state (s) to current state (s'), given an action a;
R(.) may represent a reward function;
V(.) may represent a value function to discount a current state; and
γ may represent an experimentally determined discount factor to discount the reward function.

Based on equations (6), (8), (9), and (10), the autonomous driving agent 102 may be able to select the first value (e.g., whether to display the cue or not) as the near-optimal value for the level of automation transparency, which may be calculated using an equation (11), as follows:

$$T^* = \mathrm{argmax}_T \sum_{s \in S} b(s) \times Q_{MDP}(s, a = [a_u, T]) \quad (11)$$

At 610, human trust calibration may be performed. For the human trust calibration, the autonomous driving agent 102 may control the display system 118 associated with the autonomous driving agent 102 to display a cue based on the selected first value. For example, the autonomous driving agent 102 may control the display system 118 to render a view of the scene of the surrounding environment 114. The autonomous driving agent 102 may determine a set of objects that may be visible in the rendered view. Such determination may be based on application of object detection techniques. Details of the object detection techniques may be known to one skilled in the art, and therefore, a detailed description for implementation of the object detection techniques is omitted from the disclosure for the sake of brevity. Once determined, the autonomous driving agent 102 may overlay the cue that may include visual markers over the determined ser of objects. An example presentation of cues is provided in FIGS. 7A, 7B, and 7C.

It should be noted that even though the reward function is defined in terms of the first state of the human trust, the control policy may also be dependent on the second state of the human's cognitive workload. This may be due to a coupled modeling of the human trust and the human's cognitive workload. As one example, for low automation reliability, the control policy may adopt the presence of cues (ON value or $AR_{ON}$ as the selected first value) for the automation transparency. The presence of the cues may allow the human user 120 to make an informed decision and avoid mistrust on the autonomous driving agent 102. As another example, for medium automation reliability, the control policy may adopt high transparency (ON value or $AR_{ON}$) when both the first state of the human trust and the second state of the human's cognitive workload are low. Providing the high automation transparency at low human trust may help to increase the human trust on the autonomous driving agent 102, but it may be avoided when the human's cognitive workload is high. As another example, for high automation reliability, the high automation transparency may only be used when the human's cognitive workload is low. In at least one embodiment, the high automation transparency may be adopted even when the human's cognitive workload is high and when pedestrians are present. One potential reason for this may be that the presence of the pedestrians may be interpreted as "higher risk" to the human user 120, thereby leading to less trust in the autonomous driving agent 102 if cues are absent.

In at least one embodiment, the autonomous driving agent 102 may set a level of detail that may be provided via the cues to the human user 120 for a given view of the scene and given human trust-workload dynamics. Examples of such cues may include, but are not limited to, bounding boxes, labels, annotated object(s) in the view, annotated critical objects that may have an impact on driving decisions of the autonomous driving agent 102, annotated objects that may have the attention of the human user 120 in the scene, markers, or overlay graphics for a set of decisions (e.g., a left turn, a right turn, or a straight movement) or paths (a lane marking, a stop symbol when approaching a traffic light).

Figure 7A:
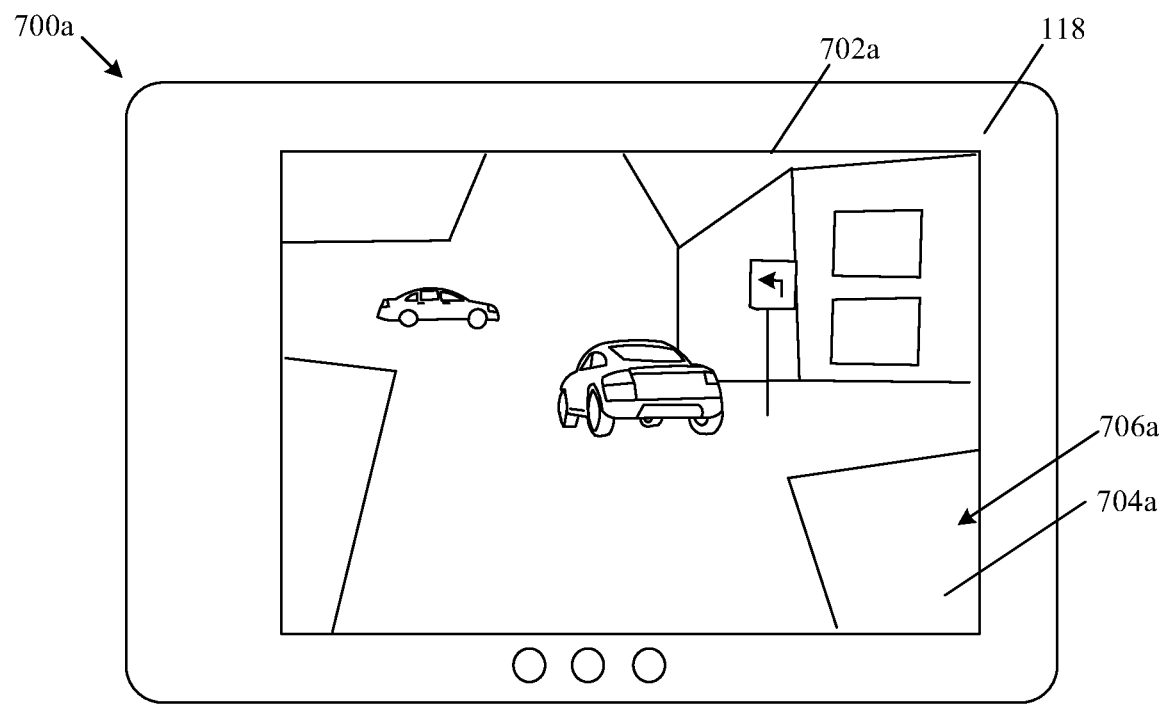
FIG. 7A is a diagram that illustrates an exemplary scenario for calibration of human trust on the autonomous driving agent of FIG. 1 in course of a journey, in accordance with an embodiment of the disclosure.
Figure 7B:
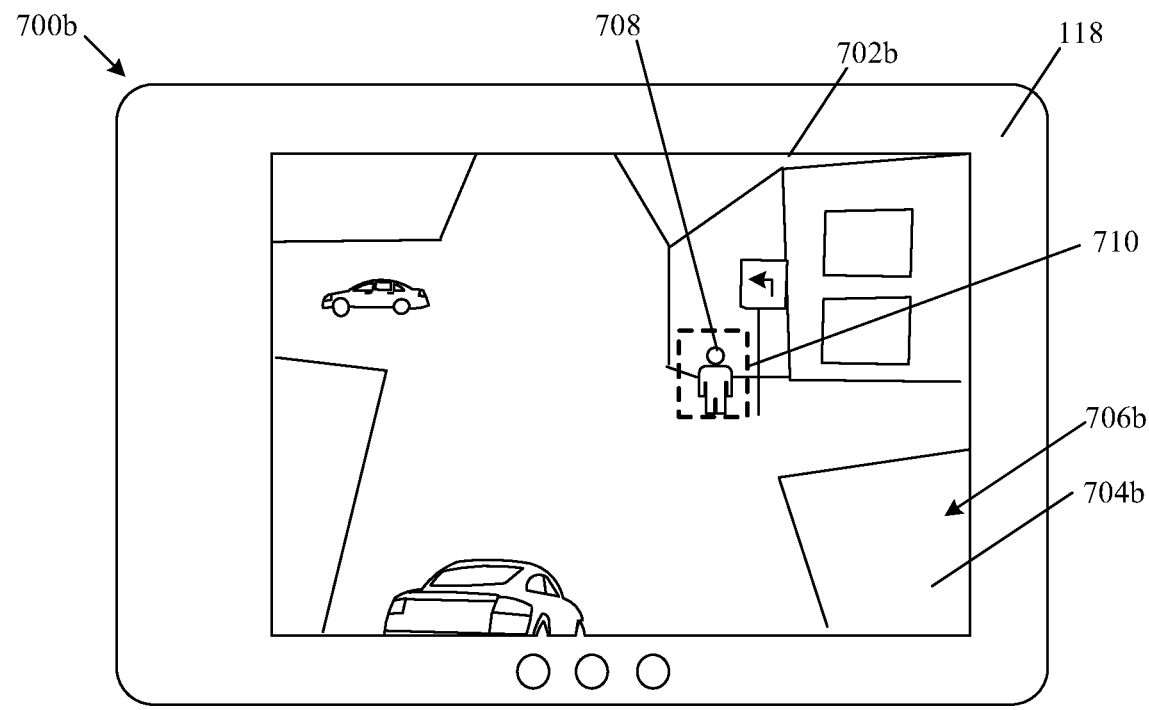
FIG. 7B is a diagram that illustrates an exemplary scenario for calibration of human trust on the autonomous driving agent of FIG. 1 in course of a journey, in accordance with an embodiment of the disclosure.

FIG. 7A is a diagram that illustrates an exemplary scenario for calibration of human trust on the autonomous driving agent of FIG. 1 in course of a journey, in accordance with an embodiment of the disclosure. FIG. 7B is explained in conjunction with elements from FIGS. 1, 2, 3, 4, 5, and 6. With reference to FIG. 7A, there is shown an exemplary scenario 700a. In the exemplary scenario 700a, there is shown a UI 702a displayed on the display system 118. The autonomous driving agent 102 may display a visual representation 704a of a driving scene 706a onto the UI 702a displayed on the display system 118. The driving scene 706a may be of the surrounding environment of the vehicle 104 and may be acquired by the front facing camera 106b. For this exemplary scenario 700a, the first state of the human trust on the autonomous driving agent 102 may be high and the human's cognitive workload may be low, while the automation reliability may be high. In such a case, the first value may be determined as "AR OFF" for the first action associated with the level of automation transparency between the human user 120 and the autonomous driving agent 102. The autonomous driving agent 102 may control the display system 118 to disable or hide an overlay of AR cues over objects, which may be detected in the visual representation 704a.

FIG. 7B is a diagram that illustrates an exemplary scenario for calibration of human trust on the autonomous driving agent of FIG. 1 in course of a journey, in accordance with an embodiment of the disclosure. FIG. 7B is explained in conjunction with elements from FIGS. 1, 2, 3, 4, 5, and 6. With reference to FIG. 7B, there is shown an exemplary scenario 700b. In the exemplary scenario 700b, there is shown a UI 702b displayed on the display system 118. The autonomous driving agent 102 may display a visual representation 704b of a driving scene 706b onto the UI 702b displayed on the display system 118. The driving scene 706b may be of the surrounding environment of the vehicle 104 and may be acquired by the front facing camera 106b. For this exemplary scenario 700b, the first state of the human trust on the autonomous driving agent 102 may be low and the human's cognitive workload may be low, while the automation reliability may be low. Also, the eye gaze of the human user 120 may be set on a pedestrian 708 who may be crossing the road, as shown in the visual representation 704b. In such a case, the first value may be determined as "AR ON" for the first action associated with the level of automation transparency between the human user 120 and the autonomous driving agent 102. The autonomous driving agent 102 may control the display system 118 to display an AR cue 710 over the pedestrian 708, which may be detected in the visual representation 704b. Herein, the AR cue 710 is show as a bounding box, which may enclose a region that includes the pedestrian 708.

Figure 7C:
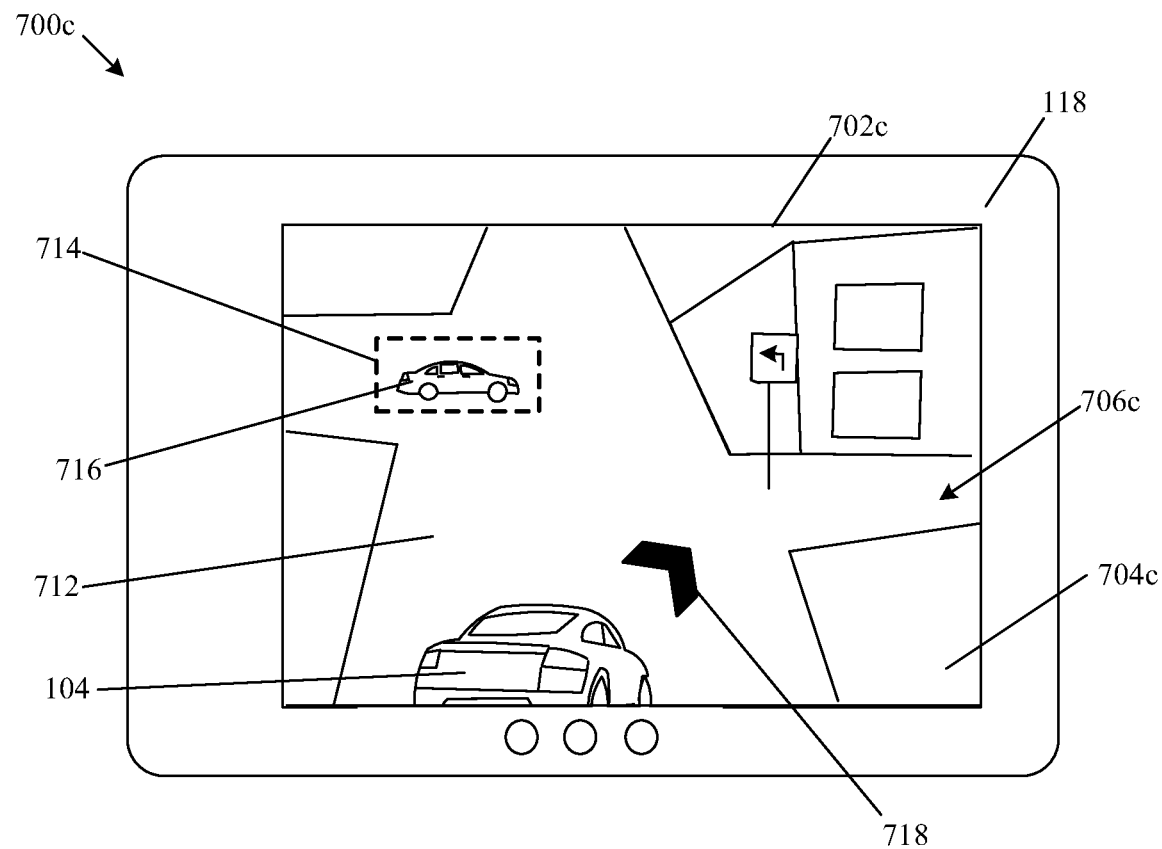
FIG. 7C is a diagram that illustrates an exemplary scenario for calibration of human trust on the autonomous driving agent of FIG. 1 in course of a journey, in accordance with an embodiment of the disclosure.

FIG. 7C is a diagram that illustrates an exemplary scenario for calibration of human trust on the autonomous driving agent of FIG. 1 in course of a journey, in accordance with an embodiment of the disclosure. FIG. 7C is explained in conjunction with elements from FIGS. 1, 2, 3, 4, 5, and 6. With reference to FIG. 7C, there is shown an exemplary scenario 700c. In the exemplary scenario 700c, there is shown a UI 702c displayed on the display system 118. The autonomous driving agent 102 may display a visual representation 704c of a driving scene 706c onto the UI 702c displayed on the display system 118. The driving scene 706c may be of the surrounding environment of the vehicle 104 and may be acquired by the front facing camera 106b. For this exemplary scenario 700b, the first state of the human trust on the autonomous driving agent 102 may be low and the human's cognitive workload may be high, while the automation reliability may be low. Also, the eye gaze of the human user 120 may be set on road 712. The scene complexity associated with the driving scene 706c may be high with respect to that associated with the driving scene 706b. In such a case, the first value may be determined as "$AR_{ON}$" for the first action associated with the level of automation transparency. The autonomous driving agent 102 may control the display system 118 to display multiple AR cues over different objects, which may be detected in the visual representation 704c. In this case, the multiple AR cues may include a bounding box 714 around another vehicle 716 in FOV of the vehicle 104 and an arrow graphic 718 overlaid on the road 712 indicating a projected moving direction of the vehicle 104 in the driving scene 706c.

It should be noted that that the UI 702a, the UI 702b, and the UI 702c merely present examples of AR cues for a limited set of driving scenes. The disclosure may not be limited to these limited set of driving scenes. In at least one embodiment, other types of AR cues may also be displayed on the display system for various types of driving scenes, without a departure from the scope of the disclosure.

Figure 8:
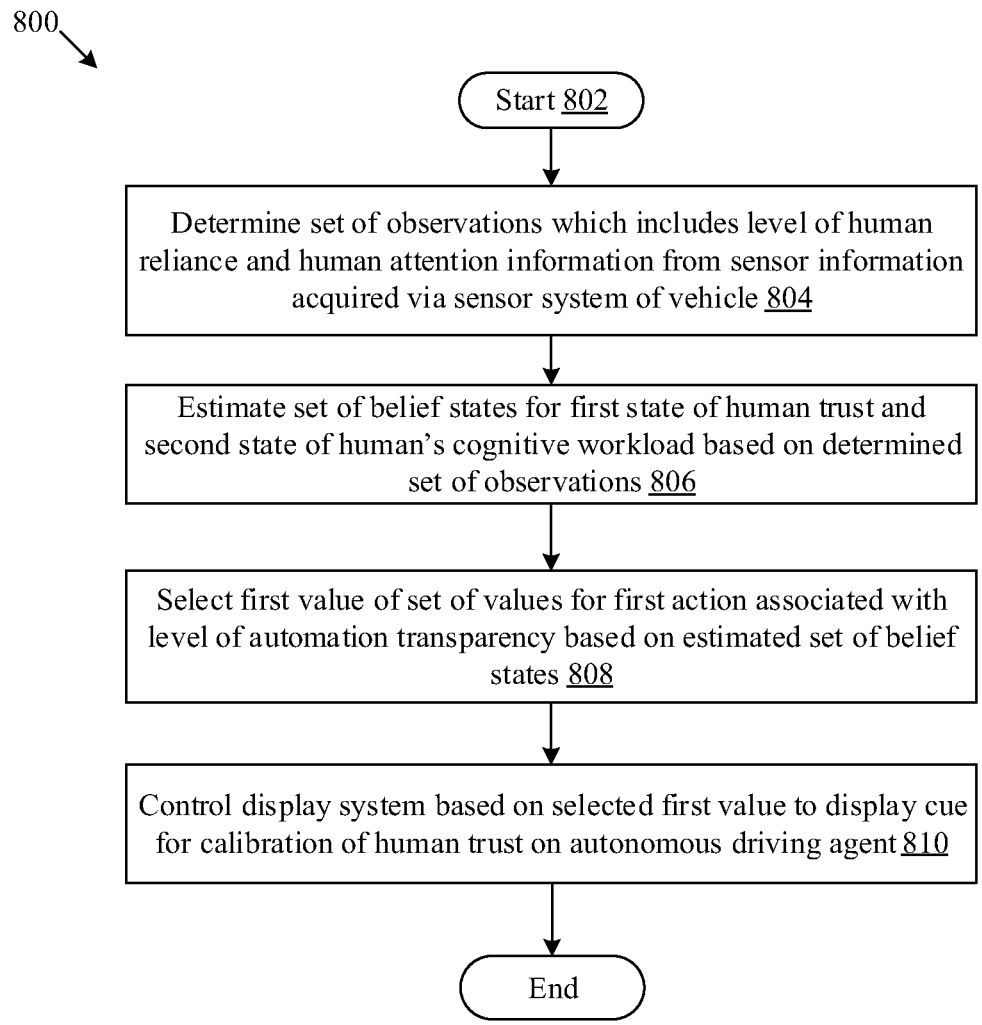
FIG. 8 is a flowchart that illustrates an exemplary method for calibration of human trust on the autonomous driving agent of FIG. 1, in accordance with an embodiment of the disclosure.

FIG. 8 is a flowchart that illustrates an exemplary method for calibration of human trust on the autonomous driving agent of FIG. 1, in accordance with an embodiment of the disclosure. FIG. 8 is explained in conjunction with elements from FIGS. 1, 2, 3, 4, 5, 6, 7A, 7B, and 7C. With reference to FIG. 8, there is shown a flowchart 800. The method illustrated in the flowchart 800 may start at 802 and proceed to 804. The method illustrated in the flowchart 800 may be performed by any computing system, apparatus, or device, such as by the autonomous driving agent 102.

At 804, the set of observations 614 which include the level of human reliance 614a and the human attention information 614b may be determined from the sensor information 612 acquired via the sensor system 106 of the vehicle 104. In an embodiment, the circuitry 202 (or the circuitry 302) may receive the sensor information 612 from the sensor system 106 of the vehicle 104. The sensor information 612 may include the human behavioral data 612b and the scene information 612a. The circuitry 202 may determine the set of observations 614 from the sensor information 612. For example, the circuitry 202 may determine the level of human reliance 614a from the human behavioral data 612b and the human attention information 614b from the scene information 612a.

At 806, based on the determined set of observations 614, a set of belief states for the first state of the human trust and the second state of the human's cognitive workload may be estimated. In an embodiment, the circuitry 202 (or the circuitry 302) may estimate the set of belief states for the first state of the human trust and the second state of the human's cognitive workload based on the determined set of observations 614. The estimation of the set of belief states may be further based on the set of previous actions 618 and the set of previous belief states 616. Details related to the determination of the set of belief states is explained, for example, in FIG. 6.

At 808, based on the estimated set of belief states, a first value of a set of values may be selected for the first action associated with the level of automation transparency between the human user 120 and the autonomous driving agent 102. In an embodiment, the circuitry 202 (or the circuitry 302) may select the first value of the set of values for the first action associated with the level of automation transparency, based on the estimated set of belief states. The selection of the first value of the set of values for the first action is explained, for example, in FIG. 6.

At 810, based on the selected first value, the display system 118 may be controlled to display a cue for the calibration of the human trust on the autonomous driving agent 102. In an embodiment, the circuitry 202 (or the circuitry 302) may control the display system 118 to display the cue for the calibration of the human trust on the autonomous driving agent 102. Details related to the calibration of the human trust is explained, for example, in FIGS. 5, 7A, 7B, and 7C. Control may further pass to end.

The flowchart 800 is illustrated as discrete operations, such as 804, 806, 808, and 810. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer. The set of instructions may be executable by the machine and/or the computer of an autonomous driving agent of a vehicle to perform operations that may include determination of a set of observations from sensor information acquired via the sensor system of the vehicle. The set of observations may include human attention information associated with a scene of a surrounding environment of the vehicle and a level of human reliance as indicated by human inputs to the autonomous driving agent. The operation may further include estimation of a set of belief states for a first state of human trust on the autonomous driving agent and a second state of human's cognitive workload in course of a journey, based on the determined set of observations. Further, the operations may include selection of a first value of a set of values for a first action associated with a level of automation transparency between a human user of the vehicle and the autonomous driving agent, based on the estimated set of belief states. The operations may further include control of a display system to display a cue for a calibration of the human trust on the autonomous driving agent, based on the selected first value.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An autonomous driving agent for a vehicle, comprising: circuitry coupled to a display system and a sensor system of the vehicle, wherein the circuitry is configured to:
   determine, from sensor information acquired via the sensor system, a set of observations comprising human attention information associated with a scene of a surrounding environment of the vehicle and a level of human reliance as indicated by human inputs to the autonomous driving agent;
   estimate, based on the determined set of observations, a set of belief states for a first state of human trust on the autonomous driving agent and a second state of a human's cognitive workload during a journey;
   estimate the set of belief states further based on a set of previous belief states of the autonomous driving agent and a set of previous actions of the autonomous driving agent associated with the set of previous belief states;
   estimate the set of belief states for the first state and the second state by solving a conditional probability distribution function for which the set of previous belief states, the set of previous actions, and the set of observations are input variables;
   select, based on the estimated set of belief states, a first value of a set of values for a first action associated with a level of automation transparency between a human user of the vehicle and the autonomous driving agent; and
   based on the selected first value, control the display system to display a cue for a calibration of the human trust on the autonomous driving agent.

2. The autonomous driving agent according to claim 1, wherein the vehicle is a self-driving vehicle and the autonomous driving agent is configured to operate the self-driving vehicle based on a level of automation.

3. The autonomous driving agent according to claim 1, wherein
   the first state of the human trust and the second state of the human's cognitive workload are states of a Partially Observable Markov Decision Process (POMDP) model, and
   the first action is one of a set of actions of the autonomous driving agent in the POMDP model.

4. The autonomous driving agent according to claim 1, wherein the circuitry is further configured to receive, from the sensor system of the vehicle, the sensor information comprising scene information associated with the surrounding environment and human behavioral data associated with the vehicle and the surrounding environment.

5. The autonomous driving agent according to claim 4, wherein the circuitry is configured to:
   determine a second action associated with a level of automation reliability on the autonomous driving agent during the journey; and
   determine a third action associated with the autonomous driving agent as a complexity of road intersections based on the scene information.

6. The autonomous driving agent according to claim 5, wherein
   the determined first action and the determined second action affect the first state of the human trust on the autonomous driving agent, and the level of human reliance on the autonomous driving agent indicates an effect of the determined first action and the determined second action on the first state.

7. The autonomous driving agent according to claim 5, wherein
the determined first action, the determined second action, and the determined third action affect the second state of the human's cognitive workload, and
the human attention information associated with the scene of the surrounding environment indicates an effect of the determined first action, the determined second action, and the determined third action on the second state of the human's cognitive workload.

8. The autonomous driving agent according to claim 1, wherein
the set of belief states comprises a first belief state for the first state of the human trust on the autonomous driving agent and a second belief state for the second state of the human's cognitive workload,
the first belief state comprises a first probabilistic measure to observe the first state of the human trust, and
the second belief state comprises a second probabilistic measure to observe the second state of the human's cognitive workload.

9. The autonomous driving agent according to claim 1, wherein the level of human reliance on the autonomous driving agent corresponds to one of: a human takeover of vehicle controls or a takeover of the vehicle controls by the autonomous driving agent.

10. The autonomous driving agent according to claim 1, wherein
the circuitry is further configured to detect a human gaze on an object type in the scene of the surrounding environment based on an application of Tobii's attention filter on scene information of the sensor information, and
the human attention information comprises the detected human gaze on the object type.

11. The autonomous driving agent according to claim 1, wherein the circuitry is further configured to select, from the set of values for the first action, the first value for the first action based on a maximization of a reward function included in a control policy for the human trust calibration.

12. The autonomous driving agent according to claim 1, wherein
the set of values for the level of automation transparency comprises an ON value and an OFF value,
the ON value corresponds to a first setting of the display system to display the cue, and
the OFF value corresponds to a second setting of the display system to hide the cue.

13. The autonomous driving agent according to claim 1, wherein the circuitry is configured to control the display system to:
render a view of the scene of the surrounding environment;
determine a set of objects visible in the rendered view; and
overlay the cue comprising visual markers over the determined set of objects.

14. The autonomous driving agent according to claim 1, wherein the cue is an Augmented Reality (AR) cue.

15. The autonomous driving agent according to claim 1, wherein the display system is one of: Multi-Information Display (MID), an automotive Head-Up Display (HUD), or an instrument cluster associated with the vehicle.

16. A method, comprising:
in an autonomous driving agent for a vehicle:
determining, from sensor information acquired via a sensor system of the vehicle, a set of observations comprising human attention information associated with a scene of a surrounding environment of the vehicle and a level of human reliance as indicated by human inputs to the autonomous driving agent;
estimating, based on the determined set of observations, a set of belief states for a first state of human trust on the autonomous driving agent and a second state of a human's cognitive workload during a journey;
estimating the set of belief states further based on a set of previous belief states of the autonomous driving agent and a set of previous actions of the autonomous driving agent associated with the set of previous belief states;
estimating the set of belief states for the first state and the second state by solving a conditional probability distribution function for which the set of previous belief states, the set of previous actions, and the set of observations are input variables;
selecting, based on the estimated set of belief states, a first value of a set of values for a first action associated with a level of automation transparency between a human user of the vehicle and the autonomous driving agent; and
based on the determined first value, controlling a display system of the vehicle to display a cue for a calibration of the human trust on the autonomous driving agent.

17. A non-transitory computer-readable medium having stored thereon computer implemented instructions that, when executed by an autonomous driving agent of a vehicle, causes the autonomous driving agent to execute operations, the operations comprising:
determining, from sensor information acquired via a sensor system of the vehicle, a set of observations comprising human attention information associated with a scene of a surrounding environment of the vehicle and a level of human reliance as indicated by human inputs to the autonomous driving agent;
estimating, based on the determined set of observations, a set of belief states for a first state of human trust on the autonomous driving agent and a second state of a human's cognitive workload during a journey;
estimating the set of belief states further based on a set of previous belief states of the autonomous driving agent and a set of previous actions of the autonomous driving agent associated with the set of previous belief states;
estimating the set of belief states for the first state and the second state by solving a conditional probability distribution function for which the set of previous belief states, the set of previous actions, and the set of observations are input variables;
selecting, based on the estimated set of belief states, a first value of a set of values for a first action associated with a level of automation transparency between a human user of the vehicle and the autonomous driving agent; and
based on the determined first value, controlling a display system of the vehicle to display a cue for a calibration of the human trust on the autonomous driving agent.

* * * * *